US012623688B2

(12) United States Patent
Bagnell et al.

(10) Patent No.: US 12,623,688 B2
(45) Date of Patent: May 12, 2026

(54) SYSTEMS AND METHODS RELATED TO TRAINING A MACHINE LEARNING MODEL USED IN CONTROLLING AUTONOMOUS VEHICLE(S)

(71) Applicant: Aurora Operations, Inc., Mountain View, CA (US)

(72) Inventors: James Andrew Bagnell, Pittsburgh, PA (US); Arun Venkatraman, Mountain View, CA (US); Sanjiban Choudhury, Pittsburgh, PA (US); Venkatraman Narayanan, Mountain View, CA (US)

(73) Assignee: Aurora Operations, Inc., Mountain View, CA (US)

( * ) Notice: Subject to any disclaimer, the term of this patent is extended or adjusted under 35 U.S.C. 154(b) by 286 days.

(21) Appl. No.: 18/269,200

(22) PCT Filed: Dec. 17, 2021

(86) PCT No.: PCT/US2021/063989
§ 371 (c)(1),
(2) Date: Jun. 22, 2023

(87) PCT Pub. No.: WO2022/146721
PCT Pub. Date: Jul. 7, 2022

(65) Prior Publication Data
US 2024/0043037 A1 Feb. 8, 2024

Related U.S. Application Data

(60) Provisional application No. 63/131,400, filed on Dec. 29, 2020.

(51) Int. Cl.
*B60W 60/00* (2020.01)
*G06N 3/044* (2023.01)
*G06N 3/084* (2023.01)

(52) U.S. Cl.
CPC .... *B60W 60/0011* (2020.02); *B60W 60/0027* (2020.02); *G06N 3/044* (2023.01);
(Continued)

(58) Field of Classification Search
CPC ..... B60W 60/0011; B60W 2554/4041; B60W 2556/10; G06N 3/044; G06N 3/045; G06F 18/214; G08G 1/166
See application file for complete search history.

(56) References Cited

U.S. PATENT DOCUMENTS

| | | | |
|---|---|---|---|
| 10,019,011 B1 * | 7/2018 | Green | B60W 60/0027 |
| 2019/0161080 A1 * | 5/2019 | Gochev | G08G 1/165 |
| 2020/0017117 A1 * | 1/2020 | Milton | G08G 1/0112 |

(Continued)

OTHER PUBLICATIONS

Berlincioni et al., "Multiple Future Prediction Leveraging Synthetic Trajectories" arXiv:2010.08948v1 [cs.CV] 8 pages, dated Oct. 18, 2020.

(Continued)

*Primary Examiner* — James J Lee
*Assistant Examiner* — Jonathan E Reinert
(74) *Attorney, Agent, or Firm* — Gray Ice Higdon

(57) ABSTRACT

Systems and methods related to controlling an autonomous vehicle ("AV") are described herein. Implementations can obtain a plurality of instances that each include input and output. The input can include actor(s) from a given time instance of a past episode of locomotion of a vehicle, and stream(s) in an environment of the vehicle during the past episode. The actor(s) may be associated with an object in the environment of the vehicle at the given time instance, and the stream(s) may each represent candidate navigation paths in the environment of the vehicle. The output may include ground truth label(s) (or reference label(s)). Implementations can train a machine learning ("ML") model based on the plurality of instances, and subsequently use the ML
(Continued)

model in controlling the AV. In training the ML model, the actor(s) and stream(s) can be processed in parallel.

20 Claims, 13 Drawing Sheets

(52) U.S. Cl.
CPC ..... *G06N 3/084* (2013.01); *B60W 2554/4041* (2020.02); *B60W 2554/80* (2020.02); *B60W 2556/10* (2020.02)

(56) References Cited

U.S. PATENT DOCUMENTS

| | | | | |
|---|---|---|---|---|
| 2020/0209858 | A1* | 7/2020 | Trofymov | G06N 20/00 |
| 2021/0009163 | A1* | 1/2021 | Urtasun | G08G 1/20 |

OTHER PUBLICATIONS

Makansi et al., "Overcoming Limitations of Mixture Density Networks: A Sampling and Fitting Framework for Multimodal Future Prediction" arXiv:1906.03631v2 [cs.CV] 18 pages, dated Jun. 8, 2020.
International Search Report and Written Opinion issued for Application No. PCT/US2021/063989, 16 pages, dated Apr. 14, 2022.
Boulton et al., "Motion Prediction using Trajectory Sets and Self-Driving Domain Knowledge" arXiv:2006.04767v2 [cs.LG] 11 pages, dated Jan. 13, 2021.
Zhang et al., "Map-Adaptive Goal-Based Trajectory Predicaiton" arXiv:2009.04450v2 [cs.LG] 13 pages, dated Nov. 13, 2020.
Liang et al., "The Garden of Forking Paths: Towards Multi-Future Trajectory Prediction" arXiv:1912.06445v3 [cs.CV] 11 pages, dated Mar. 28, 2020.

* cited by examiner

| Predicted | $A_1$ | $A_2$ |
|---|---|---|
| Distribution Over Streams for Time = 2.0 Seconds | $P(A_1, S_1) = 0.6$ <br> $P(A_1, S_2) = 0.0$ <br> $P(A_1, S_3) = 0.3$ <br> $P(A_1, S_4) = 0.0$ <br> $P(A_1, S_5) = 0.1$ <br> $P(A_1, S_6) = 0.0$ <br> $P(A_1, S_7) = 0.0$ <br> $P(A_1, S_8) = 0.0$ <br> $P(A_1, S_9) = 0.0$ <br> $P(A_1, S_0) = 0.0$ | $P(A_2, S_1) = 0.0$ <br> $P(A_2, S_2) = 0.7$ <br> $P(A_2, S_3) = 0.0$ <br> $P(A_2, S_4) = 0.2$ <br> $P(A_2, S_5) = 0.0$ <br> $P(A_2, S_6) = 0.1$ <br> $P(A_2, S_7) = 0.0$ <br> $P(A_2, S_8) = 0.0$ <br> $P(A_2, S_9) = 0.0$ <br> $P(A_2, S_0) = 0.0$ |
| Action/ Constraint | Yield at Stop Sign | Yield at Stop Sign |

490B

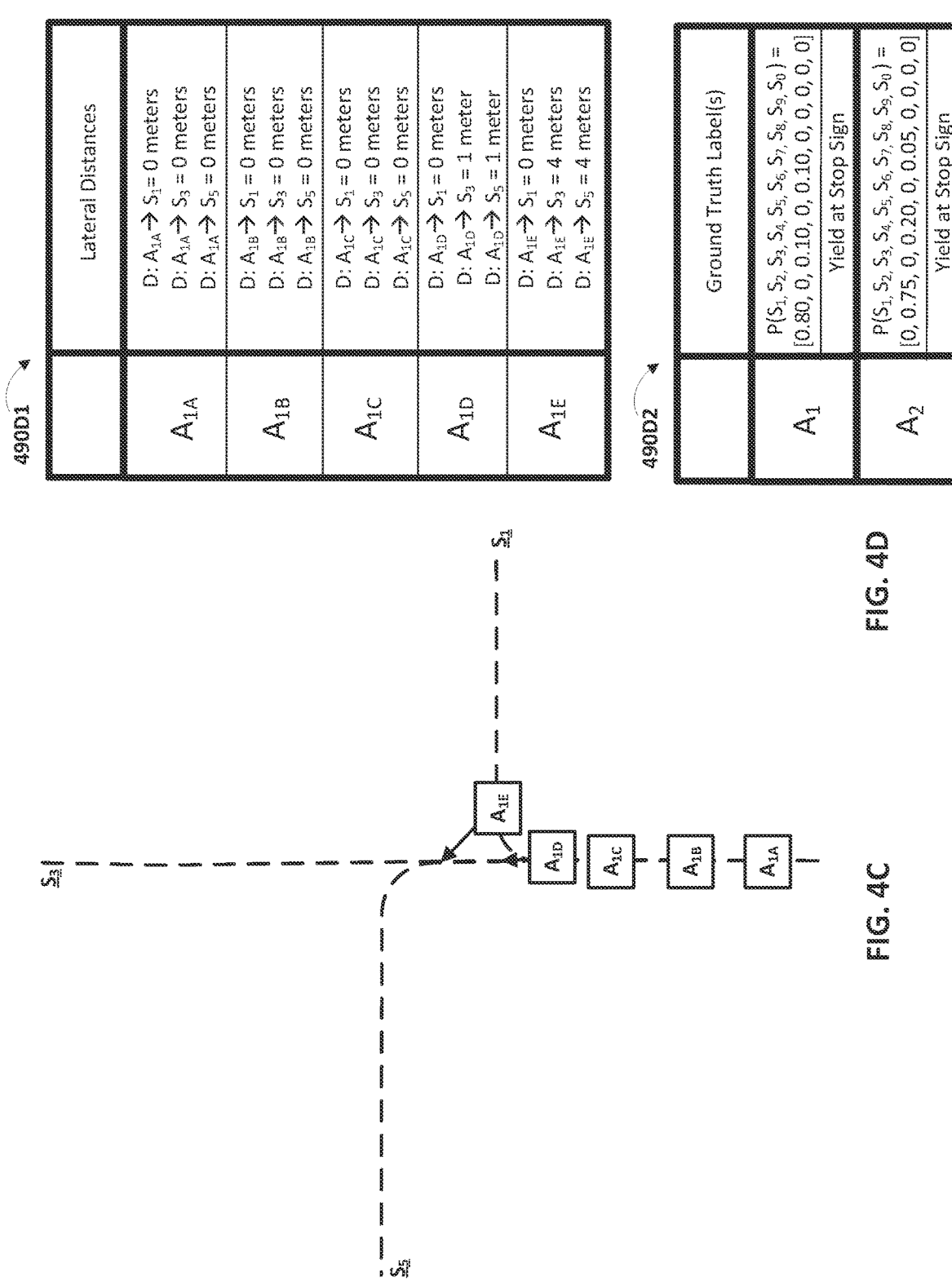

490D1

| | Lateral Distances |
|---|---|
| $A_{1A}$ | D: $A_{1A} \rightarrow S_1 = 0$ meters<br>D: $A_{1A} \rightarrow S_3 = 0$ meters<br>D: $A_{1A} \rightarrow S_5 = 0$ meters |
| $A_{1B}$ | D: $A_{1B} \rightarrow S_1 = 0$ meters<br>D: $A_{1B} \rightarrow S_3 = 0$ meters<br>D: $A_{1B} \rightarrow S_5 = 0$ meters |
| $A_{1C}$ | D: $A_{1C} \rightarrow S_1 = 0$ meters<br>D: $A_{1C} \rightarrow S_3 = 0$ meters<br>D: $A_{1C} \rightarrow S_5 = 0$ meters |
| $A_{1D}$ | D: $A_{1D} \rightarrow S_1 = 0$ meters<br>D: $A_{1D} \rightarrow S_3 = 1$ meter<br>D: $A_{1D} \rightarrow S_5 = 1$ meter |
| $A_{1E}$ | D: $A_{1E} \rightarrow S_1 = 0$ meters<br>D: $A_{1E} \rightarrow S_3 = 4$ meters<br>D: $A_{1E} \rightarrow S_5 = 4$ meters |

490D2

| | Ground Truth Label(s) |
|---|---|
| $A_1$ | $P(S_1, S_2, S_3, S_4, S_5, S_6, S_7, S_8, S_9, S_0) =$<br>$[0.80, 0, 0.10, 0, 0.10, 0, 0, 0, 0, 0]$<br>Yield at Stop Sign |
| $A_2$ | $P(S_1, S_2, S_3, S_4, S_5, S_6, S_7, S_8, S_9, S_0) =$<br>$[0, 0.75, 0, 0.20, 0, 0.05, 0, 0, 0, 0]$<br>Yield at Stop Sign |

| Predicted | $A_1$ | $A_2$ |
|---|---|---|
| Distribution Over Streams for Time = 4.0 Seconds | $P(A_1,S_1) = 0.9$ $P(A_1,S_2) = 0.0$ $P(A_1,S_3) = 0.05$ $P(A_1,S_4) = 0.0$ $P(A_1,S_5) = 0.05$ $P(A_1,S_6) = 0.0$ $P(A_1,S_7) = 0.0$ $P(A_1,S_8) = 0.0$ $P(A_1,S_9) = 0.0$ $P(A_1,S_0) = 0.0$ | $P(A_2,S_1) = 0.0$ $P(A_2,S_2) = 0.9$ $P(A_2,S_3) = 0.0$ $P(A_2,S_4) = 0.1$ $P(A_2,S_5) = 0.0$ $P(A_2,S_6) = 0.0$ $P(A_2,S_7) = 0.0$ $P(A_2,S_8) = 0.0$ $P(A_2,S_9) = 0.0$ $P(A_2,S_0) = 0.0$ |
| Action/ Constraint | $A_1$ Clear Intersection | $A_2$ Clear Intersection |

590B

Figures 5C, 5D:
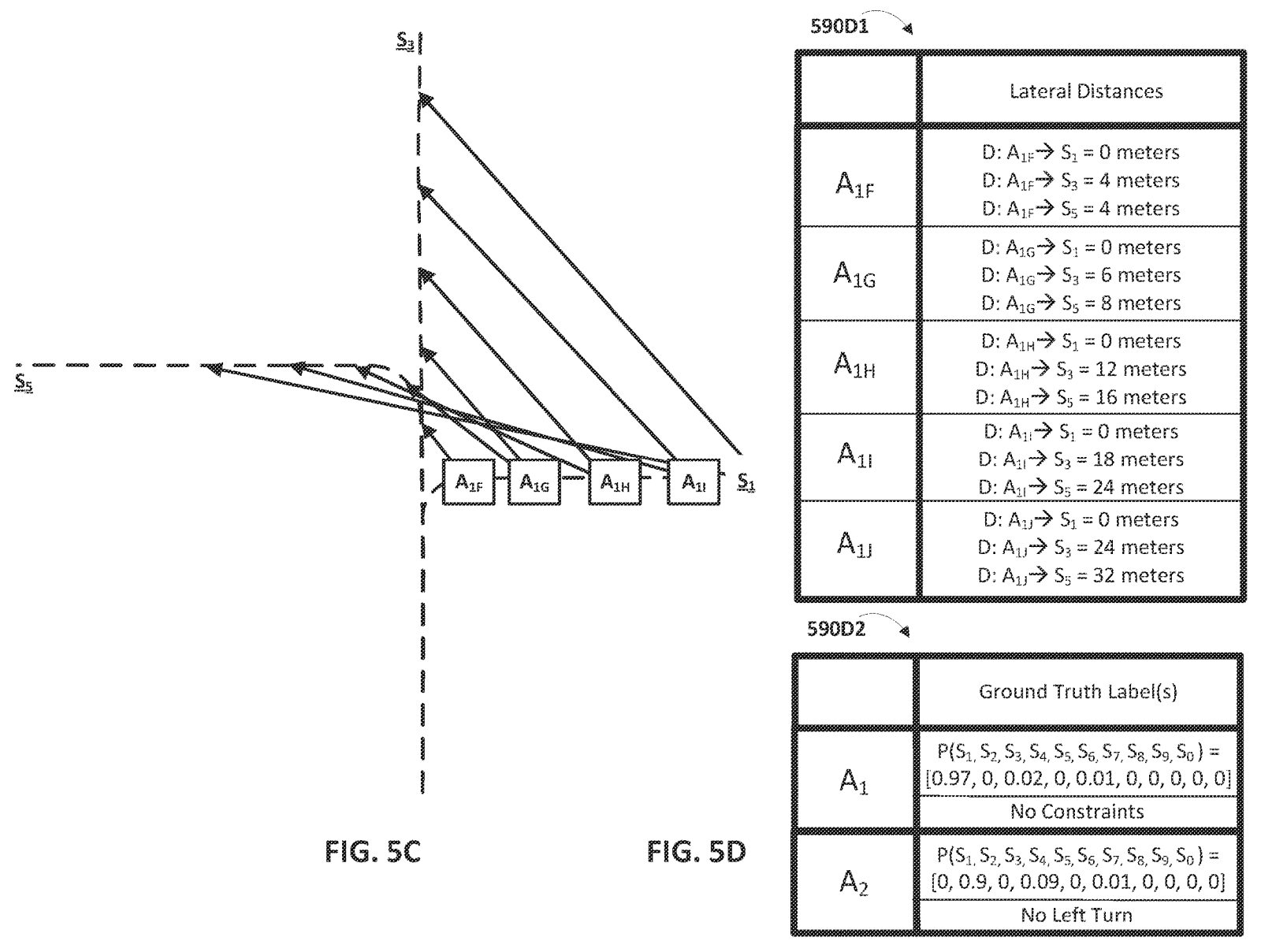

590D1

| | Lateral Distances |
|---|---|
| $A_{1F}$ | D: $A_{1F} \rightarrow S_1$ = 0 meters<br>D: $A_{1F} \rightarrow S_3$ = 4 meters<br>D: $A_{1F} \rightarrow S_5$ = 4 meters |
| $A_{1G}$ | D: $A_{1G} \rightarrow S_1$ = 0 meters<br>D: $A_{1G} \rightarrow S_3$ = 6 meters<br>D: $A_{1G} \rightarrow S_5$ = 8 meters |
| $A_{1H}$ | D: $A_{1H} \rightarrow S_1$ = 0 meters<br>D: $A_{1H} \rightarrow S_3$ = 12 meters<br>D: $A_{1H} \rightarrow S_5$ = 16 meters |
| $A_{1I}$ | D: $A_{1I} \rightarrow S_1$ = 0 meters<br>D: $A_{1I} \rightarrow S_3$ = 18 meters<br>D: $A_{1I} \rightarrow S_5$ = 24 meters |
| $A_{1J}$ | D: $A_{1J} \rightarrow S_1$ = 0 meters<br>D: $A_{1J} \rightarrow S_3$ = 24 meters<br>D: $A_{1J} \rightarrow S_5$ = 32 meters |

590D2

| | Ground Truth Label(s) |
|---|---|
| $A_1$ | $P(S_1, S_2, S_3, S_4, S_5, S_6, S_7, S_8, S_9, S_0)$ = [0.97, 0, 0.02, 0, 0.01, 0, 0, 0, 0, 0]<br>No Constraints |
| $A_2$ | $P(S_1, S_2, S_3, S_4, S_5, S_6, S_7, S_8, S_9, S_0)$ = [0, 0.9, 0, 0.09, 0, 0.01, 0, 0, 0, 0]<br>No Left Turn |

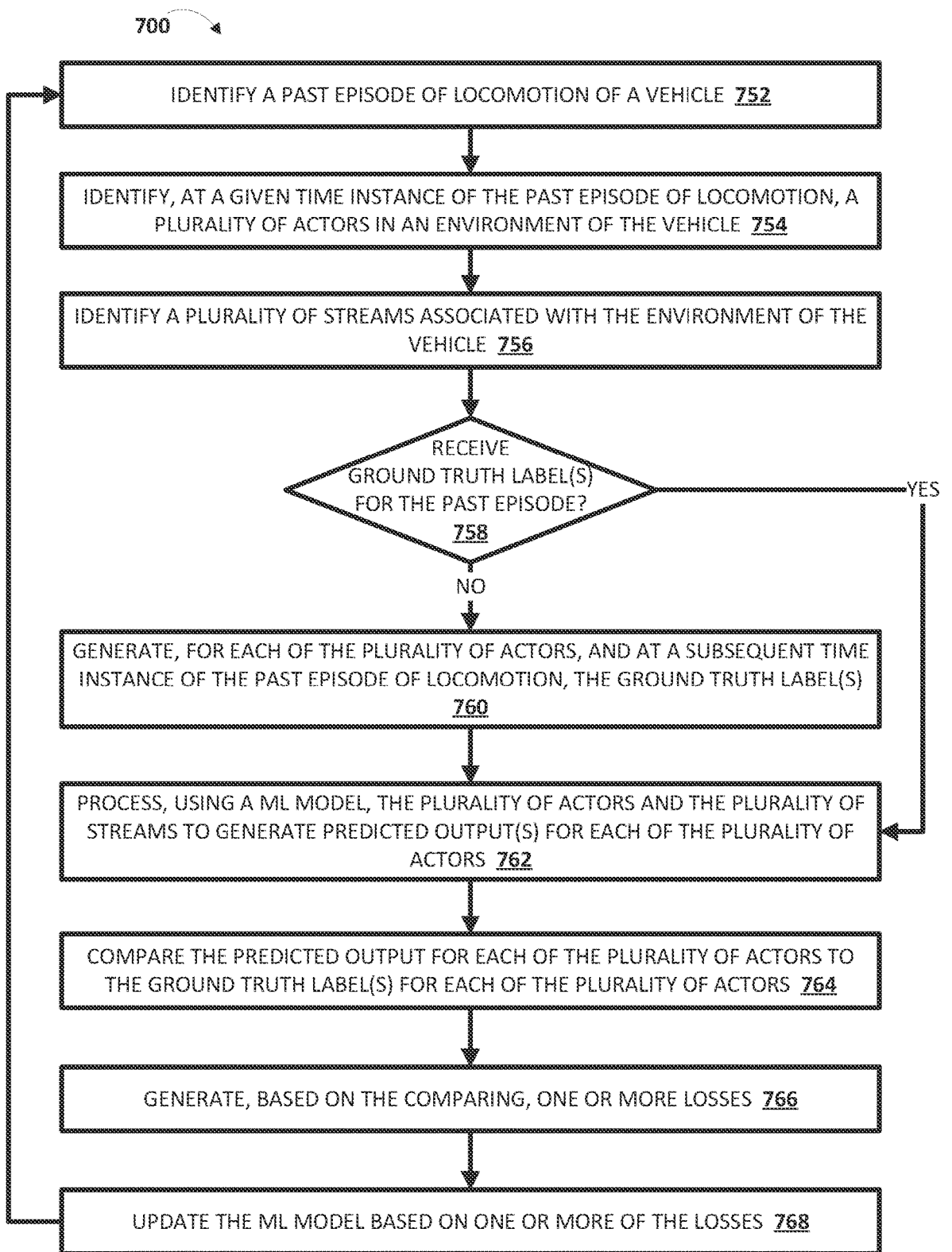

IDENTIFY A PAST EPISODE OF LOCOMOTION OF A VEHICLE 752

IDENTIFY, AT A GIVEN TIME INSTANCE OF THE PAST EPISODE OF LOCOMOTION, A PLURALITY OF ACTORS IN AN ENVIRONMENT OF THE VEHICLE 754

IDENTIFY A PLURALITY OF STREAMS ASSOCIATED WITH THE ENVIRONMENT OF THE VEHICLE 756

RECEIVE GROUND TRUTH LABEL(S) FOR THE PAST EPISODE? 758

YES

NO

GENERATE, FOR EACH OF THE PLURALITY OF ACTORS, AND AT A SUBSEQUENT TIME INSTANCE OF THE PAST EPISODE OF LOCOMOTION, THE GROUND TRUTH LABEL(S) 760

PROCESS, USING A ML MODEL, THE PLURALITY OF ACTORS AND THE PLURALITY OF STREAMS TO GENERATE PREDICTED OUTPUT(S) FOR EACH OF THE PLURALITY OF ACTORS 762

COMPARE THE PREDICTED OUTPUT FOR EACH OF THE PLURALITY OF ACTORS TO THE GROUND TRUTH LABEL(S) FOR EACH OF THE PLURALITY OF ACTORS 764

GENERATE, BASED ON THE COMPARING, ONE OR MORE LOSSES 766

UPDATE THE ML MODEL BASED ON ONE OR MORE OF THE LOSSES 768

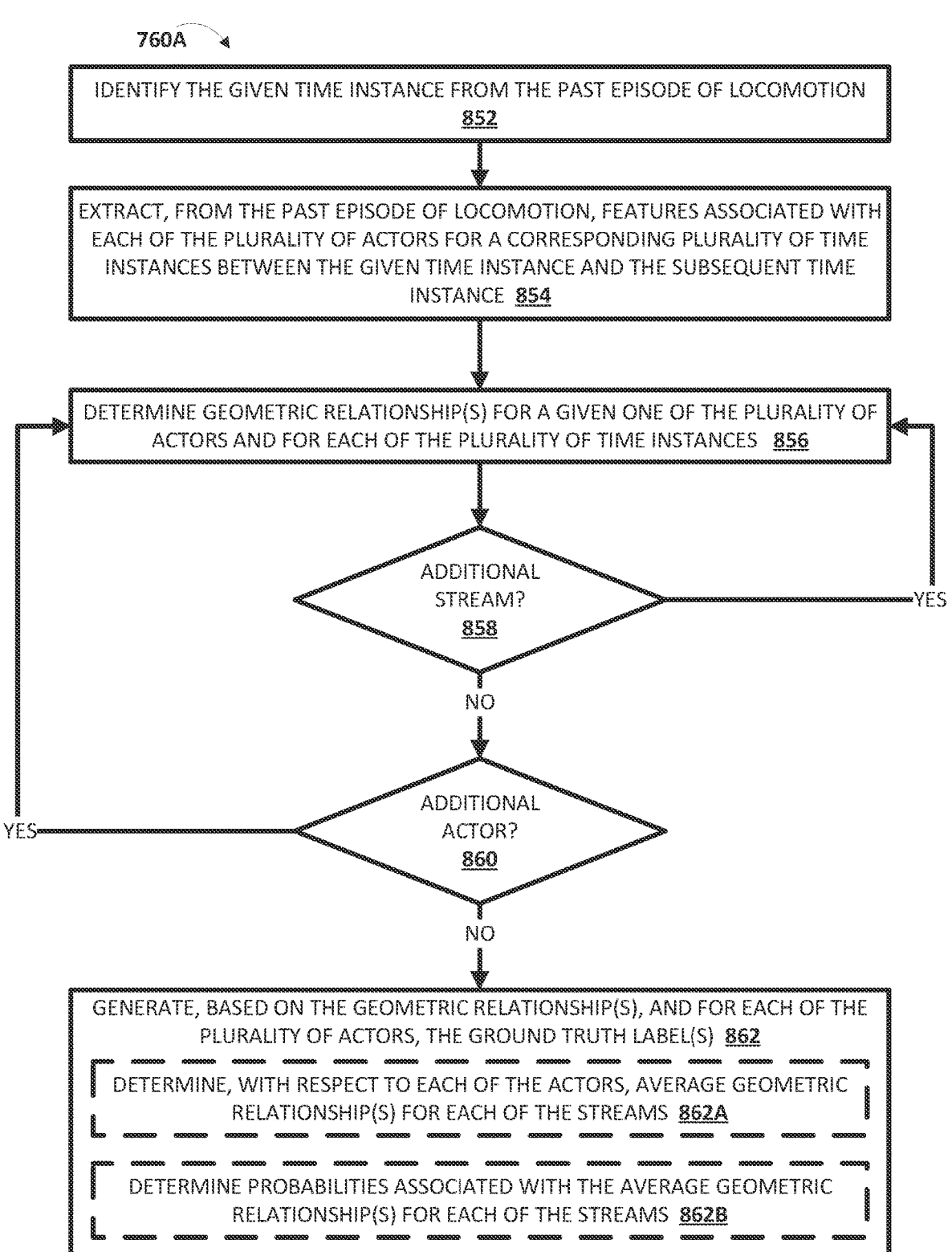

IDENTIFY THE GIVEN TIME INSTANCE FROM THE PAST EPISODE OF LOCOMOTION
852

EXTRACT, FROM THE PAST EPISODE OF LOCOMOTION, FEATURES ASSOCIATED WITH EACH OF THE PLURALITY OF ACTORS FOR A CORRESPONDING PLURALITY OF TIME INSTANCES BETWEEN THE GIVEN TIME INSTANCE AND THE SUBSEQUENT TIME INSTANCE 854

DETERMINE GEOMETRIC RELATIONSHIP(S) FOR A GIVEN ONE OF THE PLURALITY OF ACTORS AND FOR EACH OF THE PLURALITY OF TIME INSTANCES 856

ADDITIONAL STREAM? 858

YES

NO

ADDITIONAL ACTOR? 860

YES

NO

GENERATE, BASED ON THE GEOMETRIC RELATIONSHIP(S), AND FOR EACH OF THE PLURALITY OF ACTORS, THE GROUND TRUTH LABEL(S) 862

DETERMINE, WITH RESPECT TO EACH OF THE ACTORS, AVERAGE GEOMETRIC RELATIONSHIP(S) FOR EACH OF THE STREAMS 862A

DETERMINE PROBABILITIES ASSOCIATED WITH THE AVERAGE GEOMETRIC RELATIONSHIP(S) FOR EACH OF THE STREAMS 862B

FIG. 8

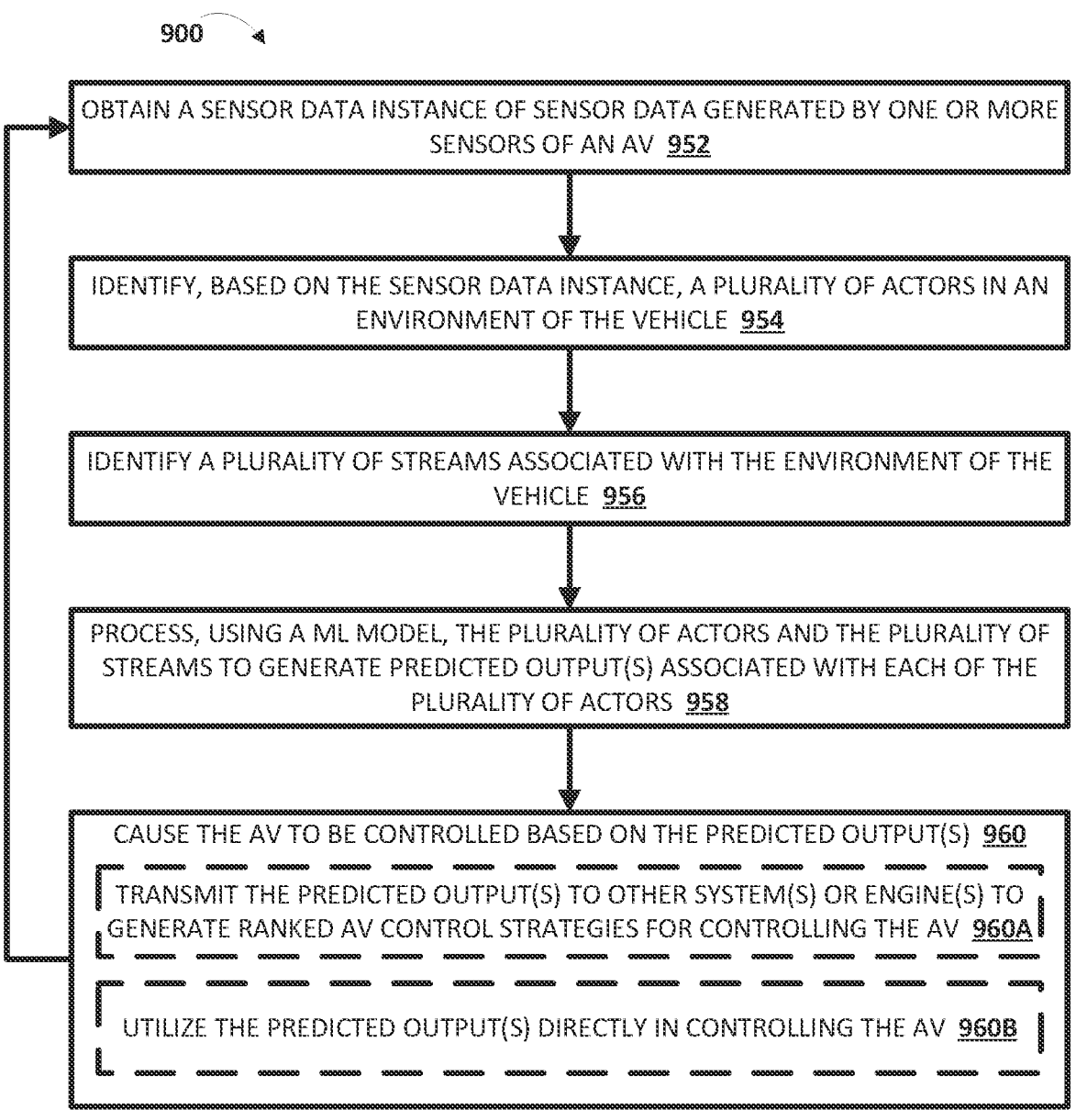

900

OBTAIN A SENSOR DATA INSTANCE OF SENSOR DATA GENERATED BY ONE OR MORE SENSORS OF AN AV 952

IDENTIFY, BASED ON THE SENSOR DATA INSTANCE, A PLURALITY OF ACTORS IN AN ENVIRONMENT OF THE VEHICLE 954

IDENTIFY A PLURALITY OF STREAMS ASSOCIATED WITH THE ENVIRONMENT OF THE VEHICLE 956

PROCESS, USING A ML MODEL, THE PLURALITY OF ACTORS AND THE PLURALITY OF STREAMS TO GENERATE PREDICTED OUTPUT(S) ASSOCIATED WITH EACH OF THE PLURALITY OF ACTORS 958

CAUSE THE AV TO BE CONTROLLED BASED ON THE PREDICTED OUTPUT(S) 960

TRANSMIT THE PREDICTED OUTPUT(S) TO OTHER SYSTEM(S) OR ENGINE(S) TO GENERATE RANKED AV CONTROL STRATEGIES FOR CONTROLLING THE AV 960A

UTILIZE THE PREDICTED OUTPUT(S) DIRECTLY IN CONTROLLING THE AV 960B

FIG. 9

SYSTEMS AND METHODS RELATED TO TRAINING A MACHINE LEARNING MODEL USED IN CONTROLLING AUTONOMOUS VEHICLE(S)

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relates to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

As used herein, the term actor or track refers to an object in an environment of a vehicle during an episode (e.g., past or current) of locomotion of a vehicle (e.g., an AV, non-AV retrofitted with sensors, or a simulated vehicle). For example, the actor may correspond to an additional vehicle navigating in the environment of the vehicle, an additional vehicle parked in the environment of the vehicle, a pedestrian, a bicyclist, or other static or dynamic objects encountered in the environment of the vehicle. In some implementations, actors may be restricted to dynamic objects. Further, the actor may be associated with a plurality of features. The plurality of features can include, for example, velocity information (e.g., historical, current, or predicted future) associated with corresponding actor, distance information between the corresponding actor and each of a plurality of streams in the environment of the vehicle, pose information (e.g., location information and orientation information), or any combination thereof. In some implementations, the plurality of features may be specific to the corresponding actors. For example, the distance information may include a lateral distance or a longitudinal distance between a given actor and a closest object, and the velocity information may include the velocity of the given actor and the object along a given stream. In some additional or alternative implementations, the plurality of features may be relative to the AV. For example, the distance information may include a lateral distance or longitudinal distance between each of the plurality of actors and the AV, and the velocity information may include relative velocities of each of the actors with respect to the AV. As described herein, these features, which can include those generated by determining geometric relationships between actors, can be features that are processed using the ML model. In some implementations, multiple actors are generally present in the environment of the vehicle, and the actors can be captured in sensor data instances of sensor data generated by one or more sensors of the vehicle.

As used herein, the term stream refers to a sequence of poses representing a candidate navigation path, in the environment of the vehicle, for the vehicle or the actors. The streams can be one of a plurality of disparate types of streams. The types of streams can include, for example, a target stream corresponding to the candidate navigation path the vehicle is following or will follow within a threshold amount of time, a joining stream corresponding to any candidate navigation path that merges into the target stream, a crossing stream corresponding to any candidate navigation path that is transverse to the target stream, an adjacent stream corresponding to any candidate navigation path that is parallel to the target stream, an additional stream corresponding to any candidate navigation path that is one-hop from the joining stream, the crossing stream, or the adjacent stream, or a null stream that corresponds to actors in the environment that are capable of moving, but did not move in the past episode of locomotion (e.g., parked vehicle, sitting pedestrian, etc.) or to actors in the environment that are not following a given stream (e.g., pulling out of the driveway, erratic driving through an intersection, etc.). In some implementations, as the vehicle progresses throughout the environment, the target stream may dynamically change. As a result, each of the other types of streams in the environment may also dynamically change since they are each defined relative to the target stream.

As used herein, the term right-of-way refers to whether any given type of stream has priority over the target stream. There can be multiple types of right-of-way including, for example, a reported right-of-way and an inferred right-of-way. The reported right-of-way is based on traffic signs, traffic lights, traffic patterns, or any other explicit indicator that can be perceived in the environment of the vehicle (e.g., based on sensor data generated by one or more sensors of the vehicle), and that gives priority to the vehicle or an additional vehicle corresponding to an actor. For instance, the reported right-of-way can be based on a state of a given traffic light (i.e., red, yellow, green), a yield sign, a merging lane sign, and so on. In contrast with the reported right-of-way, the inferred right-of-way that is based on a state of the vehicle, or more particularly, a control state of the vehicle. For instance, the inferred right-of-way of the vehicle can indicate that the vehicle should yield to a merging vehicle if the merging vehicle is in front of the vehicle on a merging stream and if the vehicle is not accelerating.

As used herein, the phrase episode of locomotion refers to an instance of a vehicle navigating through an environment autonomously, semi-autonomously, or non-autonomously. Driving data can be generated by sensors of the vehicle during the episode of locomotion. The driving data can include, for example, one or more actors captured during a given past episode of locomotion of a vehicle, and that are specific to the given past episode. As used herein, the phrase past episode of locomotion refers to a past instance of the vehicle navigating through the environment or another environment autonomously, semi-autonomously, or non-autonomously.

Consistent with one aspect of the invention, a method for training a machine learning ("ML") model for use by an autonomous vehicle ("AV") is described herein. The method may include generating a plurality of training instances. Each of the plurality of training instances may include training instance input. The training instance input may include: one or more associated actors at a given time instance of an associated past episode of locomotion of a vehicle. Each of the one or more associated actors may correspond to an object in an environment of the vehicle during the associated past episode of locomotion, and a plurality of associated streams in an environment of the vehicle during the associated past episode of locomotion. Each stream, of the plurality of associated streams, may correspond to a candidate navigation path for the vehicle or one of the associated actors. The training instance output may include one or more reference labels that are associated with the past episode of locomotion. The method may further include training the ML model using the plurality of training instances. The trained ML model may be subsequently utilized in controlling the AV.

These and other implementations of technology disclosed herein can optionally include one or more of the following features.

In some implementations, one or more of the reference labels may include a respective ground truth probability distribution, for each of the one or more associated actors, and each of the respective ground truth probability distributions may include a respective probability that the object will follow the candidate navigation path of each of the plurality of associated streams. In some versions of those implementations, the method may further include, for a particular training instance of the plurality of training instances: generating the ground truth probability distribution for each of the one or more associated actors. Generating the ground truth probability distribution for each of the one or more associated actors may include: extracting, for a plurality of time instances of the past episode that are subsequent to the given time instance, a plurality of associated features associated with each of the one or more associated actors; determining, based on the plurality of associated features associated with each of the one or more associated actors, and for each of the plurality of time instances, a lateral distance between each of the one or more associated actors and each of the plurality of associated streams; and generating, based on the lateral distance between each of the one or more associated actors and each of the plurality of associated streams, and for each of the plurality of time instances, the ground truth probability distribution for each of the one or more associated actors.

In some implementations, each of the one or more reference labels may include a ground truth constraint, for the vehicle, and associated with the given time instance or a subsequent time instance that is subsequent to the given time instance. The ground truth constraint may include information related to where the vehicle cannot be located, at the given time instance, and in the environment of the past episode of locomotion.

In some implementations, each of the one or more reference labels may include a ground truth action, for the vehicle, and associated with the given time instance or a subsequent time instance that is subsequent to the given time instance. The ground truth action may include information related to an action performed by the vehicle, at the given time instance, and in the environment of the past episode of locomotion.

In some implementations, each of the one or more associated actors from the given time instance of the past episode may include a plurality of associated features. The plurality of associated features for each of the associated actors may include at least one of: velocity information for the object, the velocity information including at least one of: a current velocity of the object, or historical velocities of the object, distance information for the object, the distance information including a distance between the object and each of the plurality of streams, or pose information associated with the object, the pose information including at least one of: location information, or orientation information for the object in the past episode.

In some implementations, each stream, of the plurality of associated streams, may correspond to a sequence of poses that represent the candidate navigation path, in the environment of the vehicle, for the vehicle or one of the associated actors. In some versions of those implementations, the plurality of associated streams may include at least one of: a target stream corresponding to the candidate navigation path the vehicle will follow, a joining stream that merges into the target stream, a crossing stream that is transverse to the target stream, an adjacent stream that is parallel to the target stream, or an additional stream that is one-hop from the joining stream, the crossing stream, or the adjacent stream.

In some implementations, the object may include at least one of an additional vehicle that is located in the environment of the vehicle, a bicyclist, or a pedestrian. In some versions of those implementations, the object may be dynamic in the environment of the vehicle along a particular stream of the plurality of streams.

In some implementations, the method may further include, for one or more of the plurality of training instances, receiving user input that defines one or more of the reference labels.

In some implementations, training the ML model based on the plurality of training instances may include, for each of the plurality of training instances: processing, using the ML model, the training instance input to generate predicted output; comparing the predicted output to one or more of the reference labels, of the corresponding training instance output, to generate an error; and updating the ML model based on the error. In some versions of those implementations, the ML model may be a transformer ML model that includes a plurality of layers, and the plurality of layers may include at least a plurality of encoding layers, a plurality of decoding layers, and a plurality of attention layers.

In some implementations, training the ML model based on the plurality of training instances may include, for each of the plurality of training instances: processing, using the ML model, the training instance input to generate predicted output; processing, using one or more additional layers of the ML model, one or more rules, or one or more additional ML models, the predicted output to rank AV control strategies; comparing the ranked AV control strategies to one or more of the reference labels, of the training instance output, to generate an error; and updating the ML model based on the error.

In some implementations, subsequently utilizing the trained ML model in controlling the AV may include: processing, using the trained ML model, sensor data generated by one or more sensors of the AV to generate predicted output; and causing the AV to be controlled based on the predicted output. In some versions of those implementations, causing the AV to be controlled based on the predicted output may include: processing, using one or more additional layers of the ML model, one or more rules, or one or more additional ML models, the output to rank AV control strategies; and causing the AV to be controlled based on one or more of the ranked AV control strategies.

Consistent with another aspect of the invention, a method for training a ML model for use by an AV is described herein. The method may include obtaining a plurality of actors for a given time instance of a past episode of locomotion of a vehicle, the plurality of actors being in an environment of the vehicle during the past episode of locomotion; obtaining a plurality of streams in the environment of the vehicle during the past episode of locomotion; and generating one or more reference labels for the past episode, of locomotion of the vehicle. The one or more of the reference labels may each define a respective ground truth probability distribution for each of the plurality of actors. The method may further include processing, using the ML model, the plurality of actors and the plurality of streams to generate predicted output. The predicted output may include a respective predicted probability distribution for each of the plurality of actors. The method may further include: comparing the predicted output to one or more of the reference labels to generate one or more losses; and updating the ML model based on one or more of the losses.

These and other implementations of technology disclosed herein can optionally include one or more of the following features.

In some implementations, generating one or more of the reference labels, for a given one of the plurality of actors, may include: extracting, from the past episode, and for a plurality of time instances of the past episode that are subsequent to the given time instance, a plurality of features associated with the given one of the plurality of actors; determining, based on the plurality of features associated with the given one of the plurality of actors, and for each of the plurality of time instances of the past episode, a lateral distance between the given one of the plurality of actors and each of the plurality of streams; and generating, based on the lateral distance between the given one of the plurality of actors and each of the plurality of streams for each of the plurality of time instances, the respective ground truth probability distribution for the given one of the plurality of actors.

In some implementations, comparing the predicted output to one or more of the reference labels to generate one or more losses may include comparing, for each of the plurality of actors, the respective ground truth probability distribution to the respective predicted probability distribution to generate one or more of the losses.

Consistent with yet another aspect of the invention, a method for using a trained ML by AV is described herein. The method may include: receiving a sensor data instance of sensor data generated by one or more sensors of the AV, the sensor data instance being captured at a given time instance; and identifying, based on the sensor data instance, a plurality of actors in an environment of the AV. Each actor, of the plurality of actors, may correspond to an object in the environment of the AV. The method may further include identifying, based on the plurality of actors in the environment of the AV, a plurality of streams associated with one or more of the plurality of actors. Each stream, of the plurality of streams, may correspond to a candidate navigation path for the AV or one of the plurality of actors. The method may further include processing, in parallel, the plurality of actors and the plurality of streams using the trained ML model to generate output; and causing the AV to be controlled based on the output generated using the trained ML model.

These and other implementations of technology disclosed herein can optionally include one or more of the following features.

In some implementations, identifying the plurality of actors in the environment of the AV may include processing the sensor data instance to identify a plurality of associated features associated with each of the plurality of actors. The plurality of features, for each of the plurality of actors, may include at least one of: velocity information for the object, the velocity information including at least one of: a current velocity of the object, or historical velocities of the object, distance information for the object, the distance information including at least a distance between the object and each of the plurality of streams, or pose information associated with the object, the pose information including at least one of: location information, or orientation information for the object. In some versions of those implementations, each stream, of the plurality of streams, may correspond to a sequence of poses that represent the candidate navigation path, in the environment of the vehicle, for the AV or the object corresponding to one of the plurality of actors.

In some further versions of those implementations, the method may further include generating a tensor of values based on: the plurality of associated features for each of the plurality of actors in the environment of the AV, and the sequence of pose instances for each of the plurality of streams in the environment of the AV. In yet further versions of those implementations, processing the plurality of actors and the plurality of streams using the trained ML model to generate the output may include processing the tensor of values using the trained ML model to generate the output.

In some further additional or alternative versions of those implementations, each stream, of the plurality of streams, may be one of: a target stream corresponding to the candidate navigation path the AV will follow, a joining stream that merges into the target stream, a crossing stream that is transverse to the target stream, an adjacent stream that is parallel to the target stream, or an additional stream that is one-hop from the joining stream, the crossing stream, or the adjacent stream.

In some implementations, causing the AV to be controlled based on the output generated using the trained ML model may include: processing, using one or more additional layers of the ML model, one or more rules, or one or more additional ML models, the output to rank AV control strategies; and causing the AV to be controlled based on one or more of the ranked AV control strategies.

In some versions of those implementations, the output may be generated using the trained ML model includes an action, and causing the AV to be controlled based on the output generated using the trained ML model may include causing the AV to be controlled based on the action at the given time instance.

In some additional or alternative versions of those implementations, the output generated using the trained ML model may include a respective probability distribution, for each of the plurality of actors, and each respective probability distribution may include a respective probability that the object will follow the candidate navigation path of each of the plurality of streams at a subsequent time instance that is subsequent to the given time instance.

In some additional or alternative versions of those implementations, the output generated using the trained ML model includes an AV constraint that indicates a location in the environment of the AV that the AV cannot be located.

In some implementations, the method further includes processing the sensor data instance to identify an environment of the AV. The sensor data instance may include at least one of: a LIDAR data instance generated by a LIDAR sensor of the AV, a RADAR data instance generated by a RADAR sensor of the AV, or an image data instance generated by one or more vision components of the AV. In some versions of those implementations, identifying the plurality of actors in the environment of the AV may include further processing the sensor data instance based on the sensor data instance to identify the plurality of actors in the environment of the AV.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), tensor processing unit(s) (TPU(s), or any combination thereof) to perform a method such as one or more of the methods described herein. Other implementations can include a system of one or more servers that include one or more processors operable to execute stored instructions to perform a method such as one or more of the methods described herein. Yet other implementations can include non-transitory computer-readable mediums storing instructions that, when executed, cause one or more processors operable to execute operations according to a method such as one or more of the methods described herein.

The above description is provided as an overview of various implementations of the present disclosure. Further description of those implementations, and other implementations, are described in more detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 4C and 4D illustrate an example of generating ground truth label(s) at the subsequent time instance of FIGS. 4A and 4B, and illustrate tables including lateral distances for generating the ground truth label(s), in accordance with various implementations.

FIGS. 5C and 5D illustrate an example of generating ground truth label(s) at the further subsequent time instance of FIGS. 5A and 5B, and illustrate tables including lateral distances for generating the ground truth label(s), in accordance with various implementations.

FIG. 7 is a flowchart illustrating an example method of training a machine learning model, in accordance with various implementations.

FIG. 8 is a flowchart illustrating an example method of generating ground truth label(s) for use in training a machine learning model, in accordance with various implementations.

FIG. 9 is a flowchart illustrating an example method of using a trained machine learning, in accordance with various implementations.

DETAILED DESCRIPTION

Figure 1:
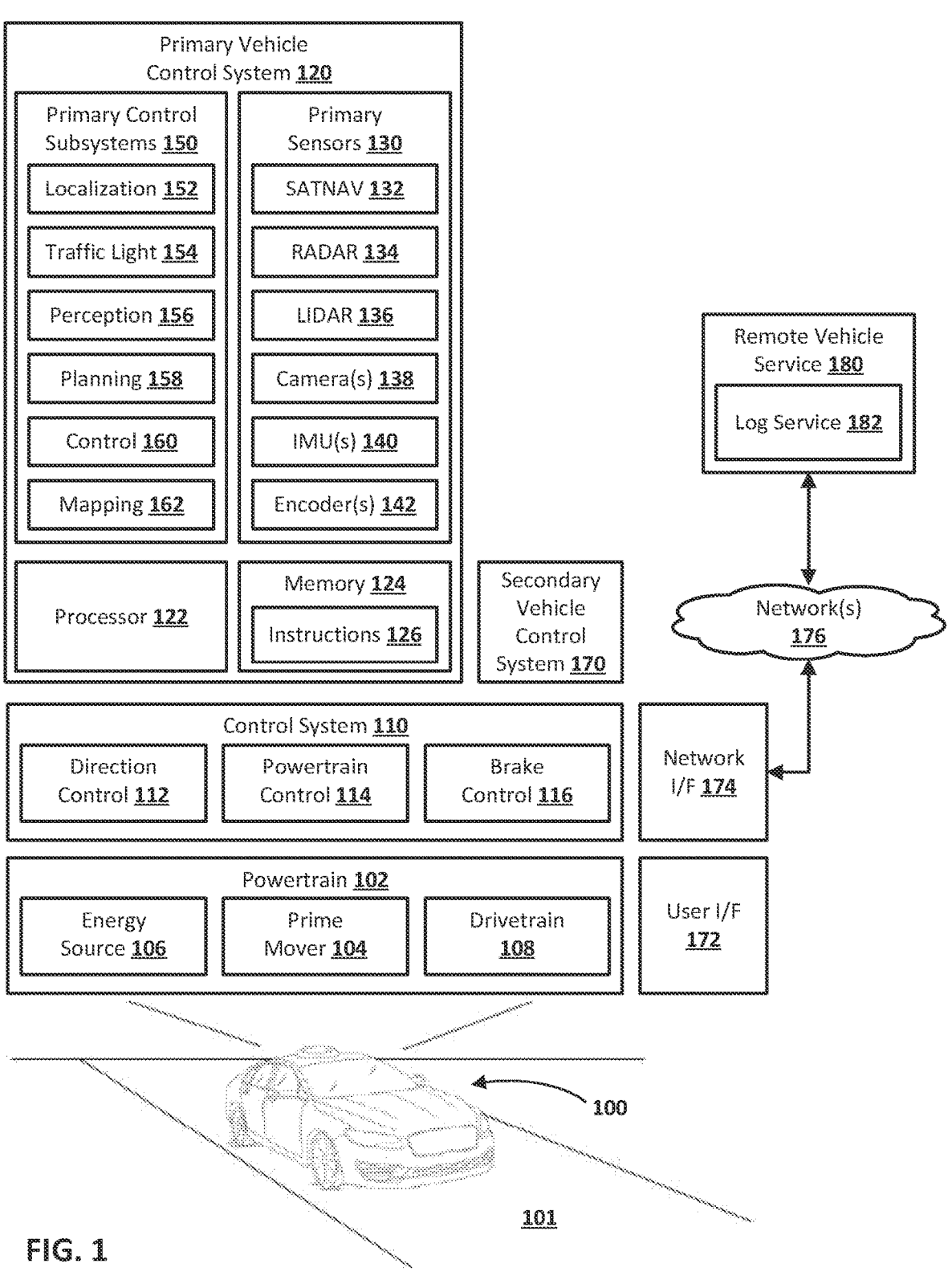
FIG. 1 illustrates an example hardware and software environment for an autonomous vehicle, in accordance with various implementations.

Implementations of the present disclosure are directed to particular method(s) or system(s) for training a machine learning ("ML") model for use in controlling an autonomous vehicle ("AV"). Various implementations described herein relate to training the ML model, based on past episodes of locomotion of a vehicle, to predict actions the AV should take in an environment, to predict corresponding probabilities of future navigation paths of objects in the environment, or both. The past episode of locomotion may be captured in driving data generated by the vehicle during driving of the vehicle or by other sensors in the environment during the driving of the vehicle. In some implementations, the driving data that captures the past episode can include manual driving data that is captured while a human is driving the vehicle (e.g., an AV or non-AV retrofitted with sensors) in a real world and in a conventional mode, where the conventional mode represents the vehicle under active physical control of a human operating the vehicle. In other implementations, the driving data that captures the past episode can be autonomous driving data that is captured while the vehicle (e.g., an AV) is driving in a real world and in an autonomous mode, where the autonomous mode represents the AV being autonomously controlled. In yet other implementations, the driving data that captures the past episode can be simulated driving data captured while a virtual human is driving the vehicle (e.g., a virtual vehicle) in a simulated world.

In some implementations, a plurality of actors can be identified, from the driving data, at a given time instance of the past episode of locomotion. The plurality of actors may each correspond to an object in the environment of the vehicle during the past episode of locomotion, and may each be associated with a plurality of features. The plurality of features can include, for example, at least one of: velocity information associated with the object corresponding to each of the plurality of actors; distance information associated with the object corresponding to each of the plurality of actors; or pose information associated with the object corresponding to each of the plurality of actors. Further, a plurality of streams can be identified in the environment of the vehicle. The plurality of streams may each correspond to a sequence of poses that represent a candidate navigation path in the environment of the vehicle. Each of the plurality of streams is for a corresponding one of the actors or is for the vehicle. For example, a first stream can be a first candidate navigation path for a first actor, a second stream can be a second candidate navigation path for the first actor, a third stream can be a candidate navigation path for the vehicle (e.g., the currently planned navigation path), etc. Moreover, the plurality of actors (or features thereof) and the plurality of streams (or the sequence of poses corresponding thereto) may be considered training instance input.

The training instance input can be processed, using the ML model, to generate predicted output(s). For example, the plurality of actors and the plurality of streams, from the given time instance of the past episode, can be processed, in parallel, using the ML model. In processing the plurality of actors and the plurality of streams, the ML model is trained to project features of each of the plurality actors onto each of the plurality of streams in the environment of the AV. This enables the ML model, through training, to be usable to leverage the features of each of the plurality of actors to determine geometric relationships between each of the plurality of actors and each of the plurality of streams. For example, these features, which can include those generated by determining geometric relationships between actors and the AV, can be features that are processed using the ML model, and are also usable to forecast navigation paths of the actors in the environment of the AV.

In some implementations, the predicted output(s) include a probability distribution for each of the plurality of actors. The probability distributions for the plurality of actors can include a respective probability, for each of the plurality of streams, that the corresponding actor will follow the stream at a subsequent time instance of the past episode of locomotion based on the plurality of actors and streams at the given time instance of the past episode. In some additional or alternative implementations, the predicted output(s) can include one or more predicted actions that the vehicle should perform at the given time instance, or a subsequent time instance, of the past episode based on the plurality of actors and streams at the given time instance of the past episode. For example, the one or more predicted actions can include whether the vehicle should yield, whether the vehicle should perform a turning action at an intersection, whether the vehicle should perform a merging action into a different lane of traffic, etc. In some additional or alternative implementations, the predicted output(s) can include one or more constraints for the vehicle at the given time instance, or subsequent time instance, of the past episode based on the plurality of actors and streams at the given time instance of the past episode. For example, the constraints can indicate locations, in the environment of the vehicle, where the vehicle should not be at the given time instance or the subsequent time instance. In other words, the constraints allow the objects corresponding to the actors to navigate in the environment of the vehicle without the vehicle interfering with the navigation paths of the objects.

In some implementations, the ground truth label(s) can be defined for the past episode of locomotion based on user input. The ground truth label(s) are also referred to herein as reference label(s). For example, user input can define ground truth probability distributions to the past episode of locomotion for each of the plurality of actors, ground truth actions to the past episode of locomotion, or ground truth constraints to the past episode of locomotion. In some additional or alternative implementations, the ground truth label(s) can be generated based on the past episode of locomotion. For example, features associated with each of the plurality of actors, from the given time instance to the subsequent time instance, can be extracted from the past episode of locomotion, and can be analyzed to determine a lateral distance between each of the plurality of actors and each of the plurality of streams at each of the time instances. In other words, a lateral distance from a first actor to a first stream can be determined at each of the plurality of time instances, a lateral distance from the first actor to a second stream can be determined for each of the plurality of time instances, and so on for each of the plurality of streams. This can be repeated for each of the plurality of actors. The ground truth label(s) can be generated for each of the plurality of actors based on the determined lateral distances. In some versions of those implementations, an average lateral distance, from each of the plurality of actors to each of the plurality of streams, and across the plurality of time instances can be determined. In these implementations, the ground truth label(s) can be generated for the plurality of actors based on the determined average lateral distances. The predicted output(s) can be compared to the ground truth label(s) to generate one or more losses. Further, one or more of the losses can be utilized to update the ML model. For example, one or more of the losses can be backpropagated across the ML model to update one or more weights thereof.

Subsequent to updating the ML model, the ML model can be utilized in controlling the AV during a current episode of locomotion. For example, a sensor data instance of sensor data generated by one or more sensors of the AV can be processed to identify a plurality of actors in an environment of the AV, and a plurality of streams can be identified based on the environment of the AV. Further, the plurality of actors and the plurality of streams (e.g., various features based thereon) can be processed, using the trained ML model, to generate output. In some implementations, the AV can be directly controlled based on the output. For example, in implementations where the output includes one or more actions the AV should perform, the AV can be controlled based on the one or more actions. In other implementations, the output can be transmitted to other systems of the AV to generate ranked AV control strategies. In some versions of those implementations, the AV can be controlled based on the ranked AV control strategies, rather than the directly controlled based on the output from the ML model.

Prior to further discussion of these and other implementations, however, an example hardware and software environment within which the various techniques disclosed herein may be implemented will be discussed.

Turning to the drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include powertrain 102 including prime mover 104 powered by energy source 106 and capable of providing power to drivetrain 108, as well as control system 110 including direction control 112, powertrain control 114 and brake control 116. Vehicle 100 may be implemented as any number of different types of vehicles, including vehicles capable of transporting people or cargo, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, prime mover 104 may include one or more electric motors or an internal combustion engine (among others), while energy source 106 may include a fuel system (e.g., providing gasoline, diesel, hydrogen, etc.), a battery system, solar panels or other renewable energy source, a fuel cell system, etc., and the drivetrain 108 may include wheels or tires along with a transmission or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances, multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and memory 124, with processors 122 configured to execute program code instructions 126 stored in memory 124.

Primary sensor system 130 may include various sensors suitable for collecting information from a vehicle's surrounding environment for use in controlling the operation of the vehicle. For example, satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection and Ranging (RADAR) and Light Detection and Ranging (LIDAR) sensors 134, 136, as well as a camera(s) 138 (which may include various types of vision components capable of capturing still or video imagery), may be used to sense stationary and moving objects within the immediate vicinity of a vehicle. Inertial measurement unit (IMU) 140 may include multiple gyroscopes and accelerometers capable of detection linear and rotational motion of a vehicle in three directions, while wheel encoder(s) 142 may be used to monitor the rotation of one or more wheels of vehicle 100.

The outputs of sensors 132-142 may be provided to a set of primary control subsystems 150, including, localization subsystem 152, traffic light subsystem 154, perception subsystem 156, planning subsystem 158, control subsystem 160, and mapping subsystem 162. Localization subsystem 152 determines location information and orientation information of vehicle 100 of vehicle 100 within its surrounding environment, and generally with respect to a particular frame of reference. This is also referred herein to as pose or pose information, which in some instances may also include one or more velocities, accelerations, or both. As will be discussed in greater detail herein, traffic light subsystem 154 identifies intersections and traffic light(s) associated therewith, and processing a stream of vision data corresponding to images of the traffic light(s) to determine a current state of each of the traffic light(s) of the intersection for use by planning, control, and mapping subsystems 158-162, while perception subsystem 156 detects, tracks, or identifies elements within the environment surrounding vehicle 100. In some implementations, traffic light subsystem 154 may be a subsystem of perception subsystem 156, while in other implementation, traffic light subsystem is a standalone subsystem. Control subsystem 160 generates suitable control signals for controlling the various controls in control system 110 in order to implement the planned path of the vehicle. Mapping subsystem 162 accesses a previous mapping of an environment of vehicle 100 that includes information regarding the elements within an environment and the relationships therebetween.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy or to cover different regions around a vehicle, and other types of sensors may be used. Likewise, different types or combinations of control subsystems may be used in other implementations. Further, while subsystems 152-162 are illustrated as being separate from processors 122 and memory 124, it will be appreciated that in some implementations, various aspects or all of the functionality of subsystems 152-162 may be implemented with program code instructions 126 resident in memory 124 and executed by one or more of processors 122. Further, these subsystems 152-162 may in some instances be implemented using the same processors or memory, while in other instances may be implemented using different processors or memory. Subsystems 152-162 in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each of processors 122 may be implemented, for example, as central processing unit(s) (CPU(s)), graphics processing unit(s) (GPU(s)), tensor processing unit(s) (TPU(s)), or any combination thereof, and each portion of memory 124 may represent random access memory (RAM) devices comprising a main storage, as well as any supplemental levels of memory, e.g., cache memories, non-volatile or backup memories (e.g., programmable or flash memories), read-only memories, etc. In addition, each portion of memory 124 may be considered to include memory storage physically located elsewhere in vehicle 100, e.g., any cache memory in a processor, as well as any storage capacity used as a virtual memory, e.g., as stored on a mass storage device or on another computer or controller. One or more of processors 122 illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, or a tape drive, among others. Furthermore, vehicle 100 may include a user interface 172 to enable vehicle 100 to receive a number of inputs from and generate outputs for a user or operator, e.g., one or more displays, touchscreens, voice interfaces, gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with network(s) 176 (e.g., a LAN, a WAN, a wireless network, Bluetooth, or the Internet, among others) to permit the communication of information with other vehicles, computers, or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 180 including, at least for the purposes of implementing various functions described herein, a log service 182. Log service 182 may be used, for example, to collect or analyze driving data from past episodes of locomotion, of one or more autonomous vehicles during operation (i.e., during manual operation or autonomous operation), of one or more other non-autonomous vehicles retrofitted with one or more of the sensors described herein (e.g., one or more of primary sensors 130), of simulated driving of a vehicle, or any combination thereof. Using the log service 182 enables updates to be made to the global repository, as well as for other offline purposes such as training machine learning model(s) for use by vehicle 100 (e.g., as described in detail herein with respect to FIG. 2).

Each of processors 122 illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail herein. Moreover, various applications, programs, objects, modules, or other components may also execute on one or more processors in another computer coupled to vehicle 100 via network(s) 176, e.g., in a distributed, cloud-based, or client-server computing environment, whereby the processing required to implement the functions of a computer program may be allocated to multiple computers or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program codes described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware or software environments may be used without departing from the scope of the invention.

Figure 2:
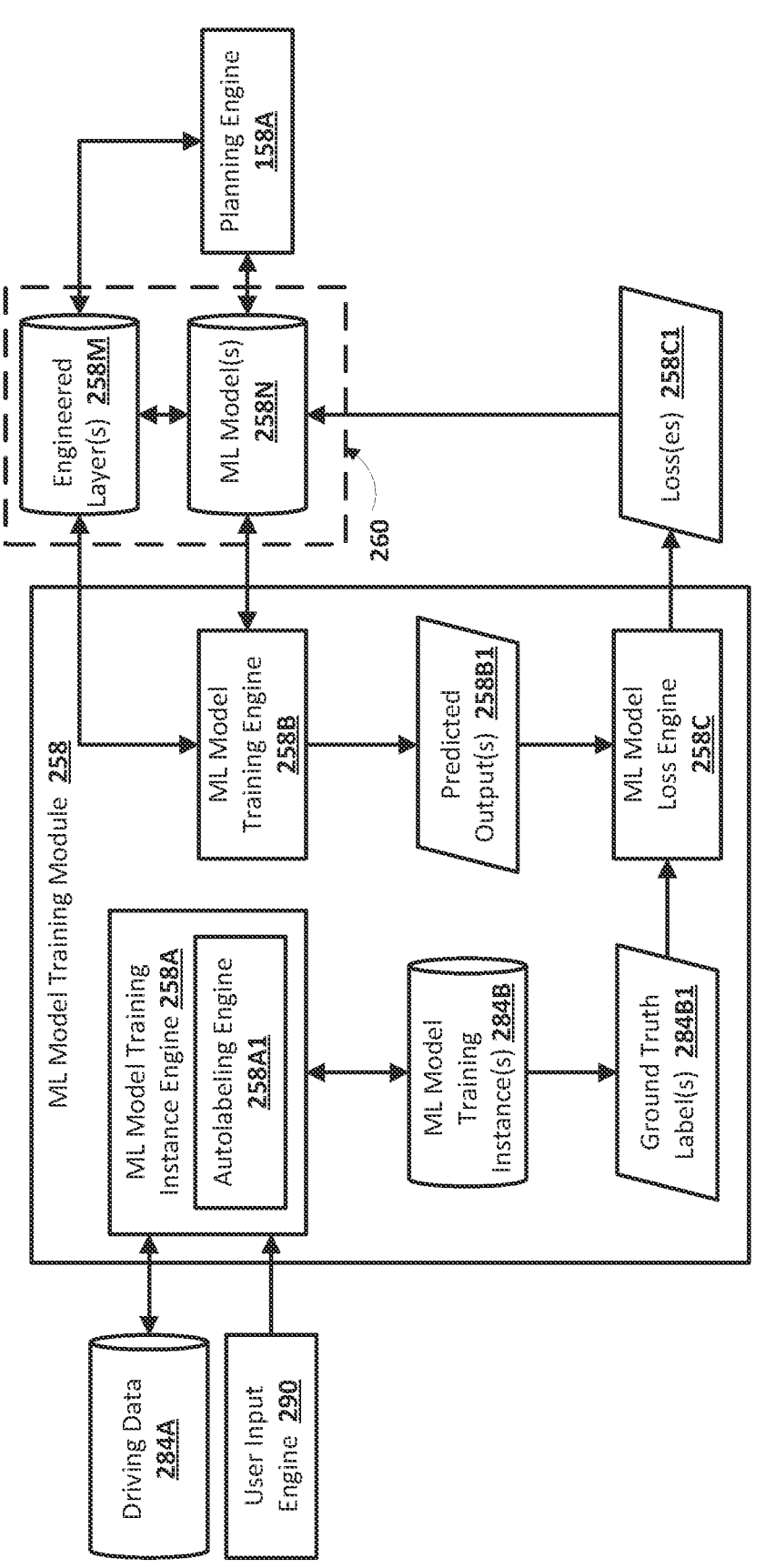
FIG. 2 is a block diagram illustrating an example training architecture for training a machine learning model that is used by a planning subsystem of an autonomous vehicle, in accordance with various implementations.

Turning now to FIG. 2, a block diagram illustrating an example training architecture for training a machine learning ("ML") model that is used by a planning subsystem e.g., planning subsystem 158) of an autonomous vehicle ("AV") (e.g., vehicle 100) is depicted. As shown in FIG. 2, ML model training module 258 can include ML model training instance engine 258A, ML model training engine 258B, and ML model loss engine 258C. The ML model training module 258 can be implemented by a computing system, or by multiple computing systems in communication over one or more networks (e.g., LAN, WAN, Internet, Wi-Fi, Bluetooth, etc.) in a distributed manner. For example, one or more aspects of the ML model training module 258 can be implemented by a server that includes the ML model, and other aspects of the ML model training module 258 can be implemented by an additional server. Although particular architectures are depicted herein, it should be understood that is for the sake of example and is not meant to be limiting.

The ML model training instance engine 258A can obtain driving data from driving data database 284A (e.g., collected via the log service 182 of FIG. 1). The driving data can include one or more actors captured during a given past episode of locomotion of a vehicle, and that are specific to the given past episode. The one or more actors can each be associated with a plurality of features. The features can include, for example, velocity information associated with each of the actors, distance information associated with each of the actors, and pose information associated with each of the actors. Further, the driving data can include a plurality of streams in an environment of the vehicle from the given past episode of locomotion of the vehicle. In some implementations, the driving data database 284A can include driving data for a plurality of disparate past episodes of locomotion of the vehicle (and optionally from past episodes of locomotion of other vehicles). In some implementations, the driving data can be manual driving data that is captured while a human is driving the vehicle (e.g., an AV or non-AV retrofitted with sensors (e.g., primary sensor 130 of FIG. 1)) in a real world and in a conventional mode, where the conventional mode represents the vehicle under active physical control of a human operating the vehicle. In other implementations, the driving data can be autonomous driving data that is captured while the vehicle (e.g., an AV) is driving in a real world and in an autonomous mode, where the autonomous mode represents the AV being autonomously controlled. In yet other implementations, the driving data can be simulated driving data captured while a virtual human is driving the vehicle (e.g. a virtual vehicle) in a simulated world. The actors, features associated with the actors, and the streams are described in greater detail below (e.g., with respect to FIGS. 3A, 4A-4D, and 5A-5D).

Moreover, the ML model training instance engine 258A can generate a plurality of training instances based on the driving data stored in the driving data database 284A. The plurality of training instances can each include training instance input and corresponding training instance output.

The ML model training instance engine 258A can generate the training instance input, for each of the plurality of training instances, by obtaining driving data for a given past episode of locomotion of the vehicle, and identifying: (i) one or more tacks from a given time instance of the given past episode; and (ii) a plurality of streams in an environment of the vehicle during the given past episode. More particularly, the ML model training instance engine 258A can identify a plurality of features associated with each of the one or more actors. As noted above, the features can include, for example, velocity information associated with each of the actors, distance information associated with each of the actors, and pose information associated with each of the actors. The corresponding training instance output can include ground truth label(s) 284B1 (or reference label(s)) for a subsequent time instance, of the given simulated episode of locomotion of the vehicle, that is subsequent to the given time instance at which the one or more actors of the training instance input are identified. For example, a given ground truth label can include an action taken by the vehicle (or an action that should have been taken by the vehicle), or a measure associated with each of the plurality of streams for each of the actors (e.g., a probability or other ground truth measure). The ML model training instance engine 258A can store each of the plurality of training instances in ML model training instance(s) database 284B.

In some implementations, the ML model training instance engine 258A can include autolabeling engine 258A1. The autolabeling engine 258A1 can extract, for a plurality of time instances of the past episode between the given time instance and the subsequent time instance, a plurality of features associated with each of the one or more actors, determine, based on the plurality of features associated with each of the one or more actors, and for each of the plurality of time instances, a lateral distance between each of the one or more actors and each of the plurality of streams, and generate, based on the lateral distance between each of the one or more actors and each of the plurality of streams for each of the plurality of time instances, the ground truth label(s) 284B1. Generating the ground truth label(s) 284B1 using the autolabeling engine 258A1 is described in greater detail below (e.g., with respect to FIGS. 4C, 4D, 5C, and 5D). In some additional or alternative implementations, the ML model training instance engine 258A can receive user input detected via user input engine 290. In some versions of those implementations, the user input detected via the user input engine 290 can define the ground truth label(s) 284B1 for the corresponding training instance output. In some other versions of those implementations, the user input detected via the user input engine 290 can alter or modify the ground truth label(s) 284B1 generated using the autolabeling engine 258A1.

The ML model training engine 258B can train an ML model stored in the ML model(s) database 258N based on the plurality of training instances stored in the ML model training instance(s) database 284B. The ML model training engine 258B can process, using the ML model, a given training instance input to generate predicted output(s) 258B1. More particularly, the ML model training engine 258B can process, using the ML model, each of the actors (or features thereof) and each of the plurality of streams (or the candidate navigation paths corresponding thereto) in parallel. In some implementations, engineered geometric transformation layers stored in engineered layer(s) database 258M can process each of the actors (or features thereof) and each of the plurality of streams (or the candidate navigation paths corresponding thereto) prior to the processing by the ML model. The engineered geometric transformation layers can correspond to one or more functions that generate a tensor of values based on processing the plurality of actors and the plurality of streams. Further, in implementations that include the engineered geometric transformation layers, the tensor of values can be applied as input across the ML model to generate the predicted output(s) 258B1. The combination of the engineered geometric transformation layers and the ML model can form an instance of a geometric transformation ML model 260.

In some implementations, the predicted output(s) 258B1 can include a predicted action that the vehicle should take at the given time instance or the subsequent time instance based on the one or more actors and the plurality of streams in the environment of the vehicle at the given time instance. For instance, if the actors and streams of the training instance input represent an additional vehicle nudging around a parked car along a joining stream and another additional vehicle travelling behind the vehicle along the target stream, then the predicted output can include a yield action. In some additional or alternative implementations, the predicted output(s) 258B1 can include constraints on the vehicle at the given time instance or the subsequent time instance. For instance, if the actors and streams of the training instance input represent an additional vehicle nudging around a parked car along a joining stream and another additional vehicle travelling behind the vehicle along the target stream, then the predicted output can include a vehicle constraint that indicates the vehicle cannot be located at a certain location in the environment (i.e., within a threshold distance to the parked vehicle). By using this constraint, the vehicle ensures that the additional vehicle has space to nudge around the parked car along the joining stream.

In some additional or alternative implementations, the predicted output(s) 258B1 can include predicted measures associated with each of the plurality of streams for each of the actors at the given time instance or the subsequent time instance. The predicted measures can include, for example, one or more probability distributions for each of the actors of the training instance input. The probabilities in the probability distribution can correspond to whether a corresponding actor will follow a corresponding one of the plurality of streams of the training instance input at the subsequent time instance of the past episode of locomotion. For instance, if the actors and streams of the training instance input represent an additional vehicle nudging around a parked car along a joining stream and another additional vehicle travelling behind the vehicle along the target stream, then the predicted output can include a first probability distribution associated with the additional vehicle that is merging from the joining stream to the target stream and a second probability distribution associated with the another additional vehicle that is travelling behind the vehicle along the target stream. The first probability distribution includes at least a first probability associated with the additional vehicle being associated with the joining stream at the subsequent time instance, and a second probability associated with the additional vehicle being associated with the target stream at the subsequent time instance. Further, the second probability distribution includes at least a first probability associated with the another additional vehicle being associated with the joining stream at the subsequent time instance, and a second probability associated with the another additional vehicle being associated with the target stream at the subsequent time instance. Generating the predicted output(s) 258B1 is described in greater detail herein (e.g., with respect to FIGS. 4A, 4B, 5A, and 5B).

In some additional or alternative implementations, the predicted output(s) 258B1 can include forecasts, at one or more future time instances, and for each of the plurality of actors, based on the one or more actors (or features thereof) and the plurality of streams in the environment of the vehicle at the given time instance that are applied as input across ML model. In some versions of those implementations, the forecasts, for each of the plurality of actors, can be predicted with respect to each of the plurality of input streams in the environment of the vehicle. Further, the forecasts, for each of the plurality of actors, can be refined in successive layers of the ML model. For example, assume a forecast associated with an object corresponding to a first actor indicates a likelihood that the object will follow a first stream at a first future time instance. The first forecast associated with the object corresponding to the first actor can be refined in successive layers of the ML to indicate that the object is more likely or less likely to follow the first stream at the first future time instance or a second future time instance. If the object is more likely to follow the first stream in this example, then the object is less likely to follow other streams in the environment of the vehicle. In contrast, if the object is less likely to follow the first stream in this example, then the object is more likely to follow other streams in the environment of the vehicle. Thus, the forecast, for each of the plurality of actors, can be defined with respect to each of the plurality of streams.

The ML model stored in the ML model(s) database 258N can be, for example, a recurrent neural network ("RNN") ML model, a transformer ML model, or other ML model(s). The ML model can include, for example, one or more of a plurality of encoding layers, a plurality of decoding layers, a plurality of feed forward layers, a plurality of attention layers, hand-engineered geometric transformation layers, or any other additional layers. The layers can be arranged in different manners, resulting in various disparate portions of the ML model. For example, the encoding layers, the feed forward layers, and the attention layers can be arranged in a first manner to generate multiple encoder portions of the ML model. Further, the decoding layers, the feed forward layers, and the attention layers can be arranged in a second manner to generate multiple decoder portions of the ML model. The multiple encoder portions may be substantially similar in structure, but may not share the same weights. Similarly, the multiple decoder portions may also be substantially similar in structure, but may not share the same weights either. Moreover, implementations that include the hand-engineered geometric transformation layers enable the plurality of actors that are applied as input across the ML model to be projected from a first stream, of the plurality of streams, to a second stream, of the plurality of streams, and so on for each of the plurality of streams in the environment. As noted above, each of the actors and streams of a given training instance input can be processed in parallel using the ML model, as opposed to being processed sequentially. As a result, and in contrast with traditional ML models that include similar architectures, the predicted output(s) 258B1 generated across the ML model are not output until the processing across the ML model is complete. In some implementations, the actors (or features thereof) and the streams of the training instance input can be represented as a tensor of values when processed using the ML model, such as a vector or matrix of real numbers corresponding to the features of the actors and the streams. The tensor of values can be processed using the ML model to generate the predicted output(s) 258B1.

The ML model loss engine 258C can generate loss(es) 258C1 based on comparing the predicted output(s) 258B1 for a given training instance to the ground truth label(s) 284B1 for the given training instance. Further, the ML model loss engine 258C can update the ML model stored in the ML model(s) database 258N based on the loss(es) 258C1. For example, the ML model loss engine 258C can backpropagate the loss(es) 258C1 across the ML model to update one or more weights of the ML model. In some implementations, the ML model loss engine 258C can generate the loss(es) 258C1, and update the ML model based on each of the training instances after processing each of the training instances. In other implementations, the ML model loss engine 258C may wait to generate the loss(es) 258C1 or update the ML model after a plurality of training instances are processed (e.g., batch training). As described above, one or more aspects of the ML model training module 258 can be implemented by various computing systems. As one non-limiting example, a first computing system (e.g., a server) can access one or more databases (e.g., the driving data database 284A) to generate the training instances, generate the predicted output(s) 258B1 using the ML model, and generate the loss(es) 258C1. Further, the first computing system can transmit the loss(es) 258C1 to a second computing system (e.g., an additional server), and the second computing system can use the loss(es) 258C1 to update the ML model.

Figure 3A:
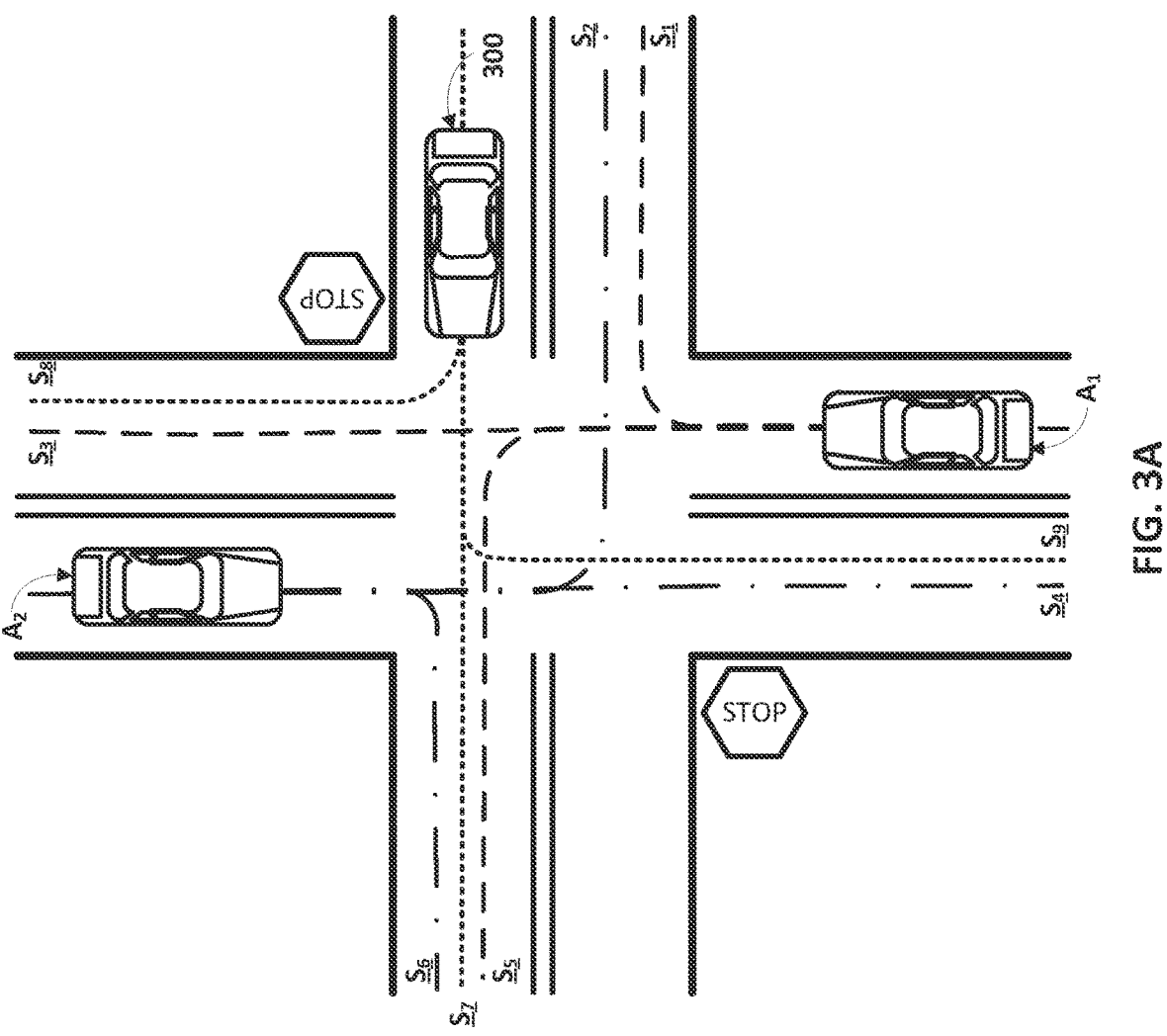
FIG. 3A illustrates an example environment at a given time instance of a past episode of locomotion of a vehicle that is utilized in training the machine learning model of FIG. 2, in accordance with various implementations.

Turning now to FIG. 3A, an example environment at a given time instance of a past episode of locomotion of a vehicle 300 that is utilized in training the ML model of FIG. 2 is illustrated. The environment of FIG. 3A is described herein with respect to using a past episode of locomotion of vehicle 300 to train the ML model (e.g., using ML model training module 258 of FIG. 2). In particular, the environment depicted in FIG. 3A can be captured by a sensor data instance of sensor data generated by one or more sensors of the vehicle 300 at the given time instance of the past episode of locomotion of the vehicle 300. As shown in FIG. 3A, the environment includes the vehicle 300 at a stop sign of a 4-way intersection where cross traffic does not stop. The vehicle 300 may be an AV (e.g., vehicle 100 of FIG. 1) or a non-AV retrofitted with sensors (e.g., primary sensor 130 of FIG. 1) in a real world environment, or a simulated vehicle in a simulated environment. Further, the environment shown in FIG. 3A also includes two additional vehicles as objects corresponding a first actor $A_1$ and a second actor $A_2$, respectively.

Moreover, the environment shown in FIG. 3A also includes a plurality of streams $S_1$-$S_9$ of a plurality of disparate types of streams. Each of the streams corresponds to a sequence of poses representing a candidate navigation path, in the environment of the vehicle 300, for the vehicle 300 or the objects corresponding to the first actor $A_1$ and the second actor $A_2$. With respect to the environment depicted in FIG. 3A, assume that the vehicle 300 will navigate straight through the four-way intersection and along stream $S_7$. In this example, stream $S_7$ may be considered a target stream since it is a stream that the vehicle is immediately preparing to follow by navigating straight through the four-way intersection. In this example, streams $S_5$ and $S_6$ may be considered joining streams since they merge into target stream $S_7$. Although streams $S_5$ and $S_6$ are depicted as distinct streams that do not merge with target stream $S_7$, it should be understood that is for the sake of illustration and clarity. Further, streams $S_3$ and $S_4$ may be considered crossing streams since they transverse target stream $S_7$. Streams $S_1$ and $S_2$ may be considered adjacent streams since they are adjacent, or parallel, to target stream $S_7$. In some examples, stream $S_2$ may also be considered a crossing stream, in addition to being considered an adjacent stream, since stream $S_2$ is also transverse to target stream $S_7$ in the middle of the intersection. Lastly, streams $S_8$ and $S_9$ may be considered additional streams.

As another example, assume that the vehicle 300 will turn left at the four-way intersection depicted in FIG. 3A along stream $S_9$. In this example, stream $S_9$ may be considered a target stream since it is a stream that the vehicle is immediately preparing to follow by turning left at the four-way intersection. In this example, stream $S_4$ may be considered a joining stream since it merges into target stream $S_9$. Although stream $S_4$ is depicted as a distinct stream that does not merge with target stream $S_9$, it should be understood that is for the sake of clarity. Further, streams $S_2$, $S_3$, and $S_5$ may be considered crossing streams since they transverses target stream $S_9$. Stream $S_1$ and may be considered an adjacent stream since it is adjacent, or parallel, to target stream $S_9$. In some examples, stream $S_2$ may also be considered a crossing stream, in addition to being considered an adjacent stream, since stream $S_2$ is also transverse to target stream $S_7$ in the middle of the intersection. Lastly, streams $S_6$, $S_7$ and $S_8$ may be considered additional streams.

Continuing with both of the above examples, the additional vehicles corresponding to the first actor $A_1$ and the second actor $A_2$ have right-of-way over the vehicle 300 in navigating through the intersection depicted in FIG. 3A. In particular, the vehicle 300 is at a stop sign, whereas neither of the additional vehicles corresponding to the first actor $A_1$ and the second actor $A_2$ have a stop sign as they enter the intersection. As such, this reported right-of-way indicates that the vehicle 300 should yield at the stop sign until the additional vehicles corresponding to the first actor $A_1$ and the second actor $A_2$ clear the four-way intersection depicted in FIG. 3A. Although the environment of FIG. 3A is depicted as having particular streams, it should be understood that this is for the sake of example and is not meant to be limiting. For instance, additional streams may be included if the vehicle 300 or the actors are allowed to take a U-turn at the intersection, or if a pedestrian crosswalk is included in the environment of the vehicle 300.

The first actor $A_1$ and the second actor $A_2$ depicted in FIG. 3A can each be associated with a plurality of features. In some implementations, the plurality of features can be defined with respect to the vehicle 300, the actor $A_1$ and $A_2$, the streams $S_1$-$S_9$, other features of the environment (e.g., lane lines, points of interest for a given intersection, guard rails, barriers, curbs, etc.), or any combination thereof. In other words, the plurality of features for a given actor can include a plurality of geometric relationships, for a given actor, that define where the given actor is in the environment with respect to each of the other actor s, streams, other features of the environment, or any combination thereof.

Figure 3B:
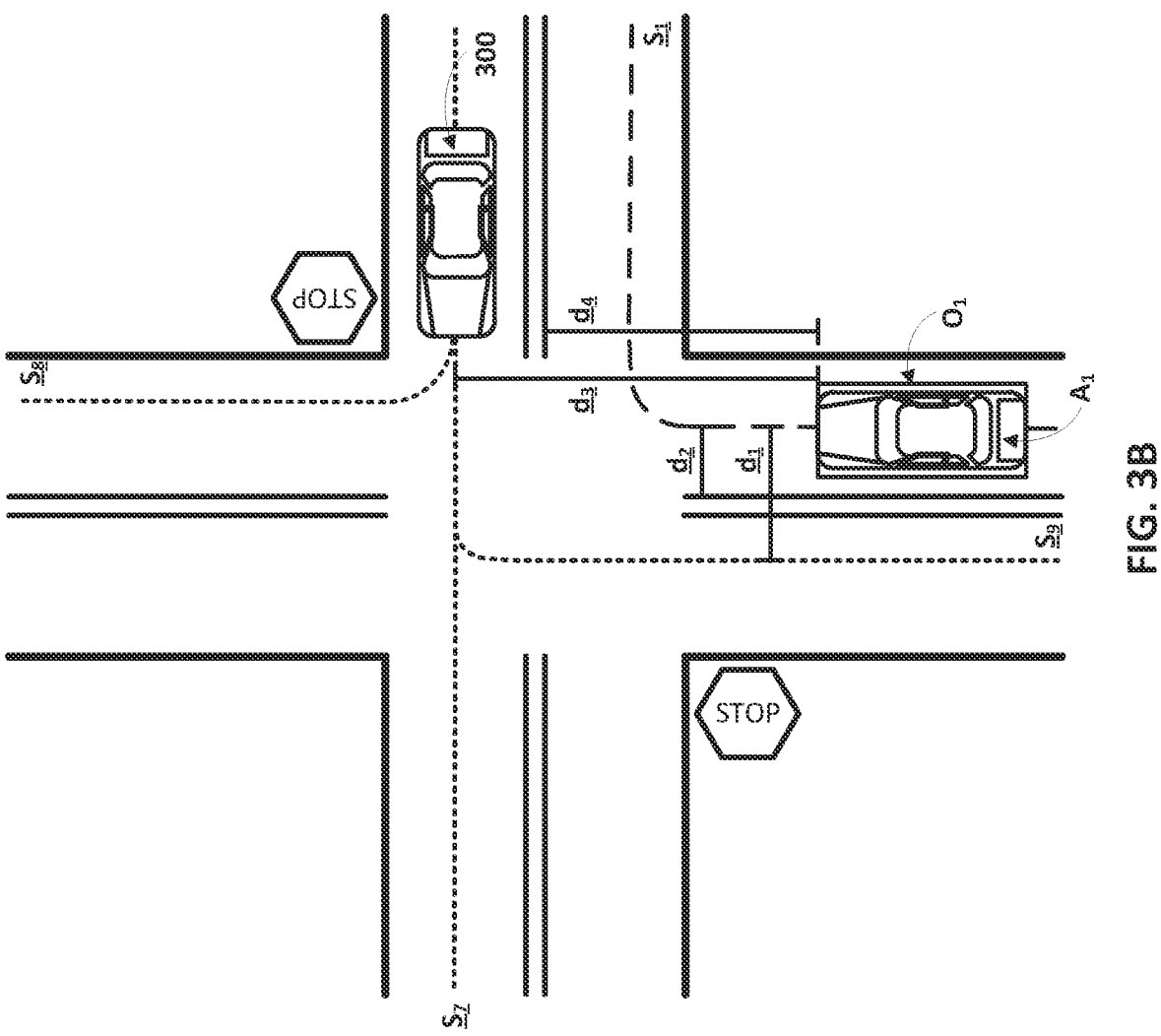
FIG. 3B illustrates a simplified version of the example environment of FIG. 3A, and includes geometric relationship(s) for a given actor in the example environment during the past episode of locomotion of the vehicle, in accordance with various implementations.

For example, and referring briefly to FIG. 3B, assume the first actor $A_1$ is following stream $S_1$. The plurality of features associated with the first actor $A_1$ can include at least a first lateral distance $d_1$ between the first actor $A_1$ and stream $S_9$, a second lateral distance $d_2$ between the first actor $A_1$ and a first lane line associated with the first actor $A_1$, a first longitudinal distance $d_3$ between the first actor $A_1$ and the vehicle 300, a fourth longitudinal distance $d_4$ between the first actor $A_1$ and a second lane line associated with the vehicle 300, and a first orientation $O_1$ of the first actor $A_1$. Although the environment of FIG. 3B is depicted as having particular features and is depicted as having particular streams, it should be understood that is for the sake of example and for the sake of clarity, and is not meant to be limiting. For example, the plurality of features associated with the first actor $A_1$ can also include lateral or longitudinal distances to each of the streams of FIG. 3A, lateral or longitudinal distances to other lane lines, barriers, objects (e.g., the second actor $A_2$), etc. Further, the plurality of features an absolute velocity of the first actor $A_1$, a relative velocity of the first actor $A_1$ with respect to the second actor $A_2$, an acceleration of the first actor $A_1$, and so on. The second actor $A_2$ can be associated with similar features, but that are defined with respect to the second actor $A_2$. In some implementations, the plurality of features provides geometric information among the actors $A_1$ and $A_2$, the vehicle 300, and the environment. The ML model can be used to process this geometric information to forecast candidate navigation paths of the actors $A_1$ and $A_2$ at subsequent time instances based on the plurality of features at a given time instance. In various implementations, utilizing this geometric information as part of the input features that are processed using the ML model can enable more efficient training of the ML model, or can result in increased robustness or accuracy of the ML model during use.

Referring back to FIG. 3A, and assuming that the environment of FIG. 3A corresponds to the past episode of locomotion of the vehicle 300 at the given time instance, the first actor $A_1$ and the second actor $A_2$ (or respective features thereof), and of the plurality of streams $S_1$-$S_9$ can be processed, using the ML model, to generate predicted output(s). In some implementations, the actors and streams are processed, using the ML model, in a parallelized manner. In other words, there is no particular sequence or order in which the actors and streams need to be processed using the ML model. In some implementations, the predicted output(s) can be one or more predicted actions that the vehicle 300 should take at the given time instance or a subsequent time instance, that is subsequent to the given time instance, based on the actors and streams processed using the ML model. For instance, the one or more predicted actions can include an indication that the vehicle 300 should yield at a particular location in the environment (e.g., at the stop sign), that the vehicle 300 should enter the intersection and turn in a desired direction or navigate through the intersection, and so on. In some additional or alternative implementations, the predicted output(s) can include one or more constraints for the vehicle 300 at the given time instance or the subsequent time instance based on the actors and streams processed using the ML model. In contrast with the one or more predicted actions that should be performed by the vehicle 300, the one or more constraints for the vehicle 300 indicate actions that the vehicle 300 cannot take or locations in the environment that the vehicle cannot be located. For instance, the one or more constraints can include an indication that the vehicle 300 cannot accelerate along the target stream to allow an additional vehicle corresponding to a given actor to merge from a joining stream to a target stream along which the vehicle 300 is navigating, that indicates the vehicle 300 cannot enter a given intersection, and so on.

In some additional or alternative implementations, the predicted output(s) can include one or more predicted measures, for each of the actors, at the given time instance or the subsequent time instance based on the actors and streams processed using the ML model. The predicted measures can be, for example, probability distributions associated with each of the plurality of actors. For example, and turning to FIGS. 4A and 4B, the real world environment of FIG. 3A at the subsequent time instance, and a table including predicted output(s) generated, using the ML model, are depicted. Assume that the first actor $A_1$ (or respective features thereof) and the second actor $A_2$ (or respective features thereof), and of the plurality of streams $S_1$-$S_9$ at a given time instance (e.g., time=0.0 seconds) are processed, using the ML model, to generate predicted output(s) at a subsequent time instance (e.g., time=2.0 seconds). In some implementations, the techniques described herein do not require a simulated episode of locomotion of the vehicle 300 be performed based on the simulated episode of the vehicle depicted in FIG. 3A and throughout FIGS. 4A and 5A to generate the predicted output(s). However, it should be understood that, in various implementations, a simulator can be configured based on the environment of FIG. 3A and a simulated episode of locomotion of the vehicle 300 can be performed to generate the predicted output(s).

Figures 4A, 4B:
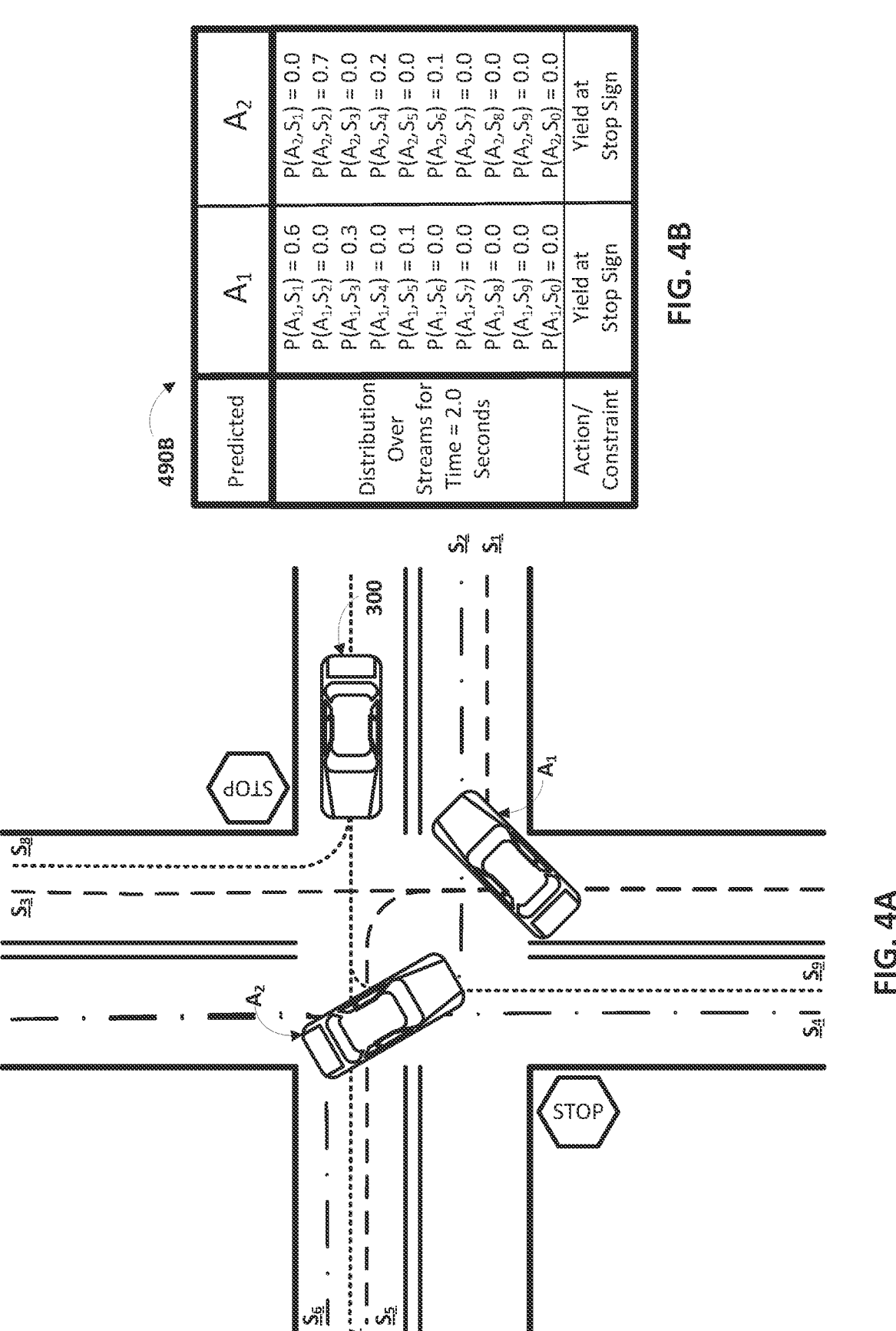
FIGS. 4A and 4B illustrate the example real world environment of FIGS. 3A and 3B at a subsequent time instance, and illustrate a table including predicted output(s) generated, using a machine learning model, at the subsequent time instance, in accordance with various implementations.

In particular, FIG. 4A depicts the environment of FIG. 3A, but progressed two seconds to the subsequent time instance of the past episode (e.g., time=2.0 seconds). As shown in FIG. 4A, it appears that the additional vehicle corresponding to the first actor $A_1$ is taking a right turn at the intersection, and the another additional vehicle corresponding to the second actor $A_2$ is taking a left turn at the intersection. However, based on features of the first actor $A_1$ and the second actor $A_2$ at the given time instance (e.g., as shown in FIG. 3A), it is unlikely that the ML model will predict that the additional vehicle corresponding to the first actor $A_1$ is taking the right turn and that the another additional vehicle corresponding to the second actor $A_2$ is taking the left turn until closer to the subsequent time instance (e.g., closer to time=2.0 seconds as the additional vehicle slows down and begins turning). Further, table 490B of FIG. 4B includes the predicted output(s) generated based on the actor s and streams of FIG. 3A for the subsequent time instance (e.g., time=2.0 seconds). The predicted output(s) depicted in the table 490B include a probability distribution over the streams for each of the actor s, and constraints for the vehicle 300. For example, as shown in FIG. 4B, a first probability distribution for the first actor $A_1$: [$S_1$, $S_2$, $S_3$, $S_4$, $S_5$, $S_6$, $S_7$, $S_8$, $S_9$, $S_0$] corresponding to $A_1$: [0.6, 0.0, 0.3, 0.0, 0.1, 0.0, 0.0, 0.0, 0.0, 0.0] can be generated as the predicted output associated with the first actor $A_1$ along with the action/constraint of yield at stop sign, and where $S_0$ corresponds to a null stream. Further, a second probability distribution for the second actor $A_2$: [$S_1$, $S_2$, $S_3$, $S_4$, $S_5$, $S_6$, $S_7$, $S_8$, $S_9$, $S_0$] corresponding to $A_2$: [0.0, 0.7, 0.0, 0.2, 0.0, 0.1, 0.0, 0.0, 0.0, 0.0] can be generated as the predicted output associated with the second actor $A_2$ along with the action/constraint of yield at stop sign. In this example, yielding at the stop sign can be considered both an action and a constraint on the vehicle 300. In other words, this action/constraint indicates a yielding action, and indicates the vehicle should not enter the intersection.

In some implementations, ground truth label(s) (or reference label(s)) can be generated based on features associated with the first actor $A_1$ and features the second actor $A_2$ at a plurality of time instances between the given time instance (e.g., time=0.0 seconds) and the subsequent time instance (e.g., time=2.0 seconds). For example, and turning to FIGS. 4C and 4D, an example of generating the ground truth label(s) at the subsequent time instance of FIGS. 4A and 4B, and tables including lateral distances for generating the ground truth label(s) is depicted. In some implementations, FIG. 4C depicts streams $S_1$, $S_3$, and $S_5$ that are associated with candidate navigation paths of the first actor $A_1$ without other portions of the environment (e.g., without lane lines, stop signs, the vehicle 300, the second actor $A_2$, or other streams). Further, FIG. 4C depicts various instances $A_{1,4}$-

$A_{1E}$ of the first actor $A_1$ from the given time instance to the subsequent time instance. In other words, the first actor instance $A_{1A}$ of the first actor $A_1$ corresponds to the additional vehicle corresponding to the first actor $A_1$ as depicted in FIG. 3A (e.g., at time=0.0 seconds), and the fifth actor instance $A_{1E}$ of the first actor $A_1$ corresponds to the additional vehicle corresponding to the first actor $A_1$ as depicted in FIG. 4A (e.g., at time=2.0 seconds), and the other actor instances $A_{1B}$-$A_{1D}$ of the first actor $A_1$ correspond to the additional vehicle at a plurality of time instances therebetween.

In generating the ground truth label(s) (e.g., using the autolabeling engine 258A1 of FIG. 2), features associated with the additional vehicle corresponding to the first actor $A_1$ at each of the time instances can be extracted and analyzed to generate the ground truth label(s). The features can include velocity information, distance information, and pose information. For instance, the velocity information can include a current velocity of the additional vehicle corresponding to the first actor $A_1$ at a given one of the time instances, historical velocities up to the given one of the time instances, or predicted future velocities at future time instances. The distance information can include a lateral distance between the additional vehicle corresponding to the first actor $A_1$ and each of the plurality of streams $S_1$-$S_9$ (even though only streams $S_1$, $S_3$, and $S_5$ are depicted in FIG. 4C) at each of the time instances. The pose information can include position information and location information of the additional vehicle corresponding to the first actor $A_1$, within the environment of the vehicle 300, at each of the time instances.

For example, the system can compare features associated with the first actor $A_1$ at each of the time instances to the sequence of poses for each of the streams $S_1$-$S_9$. In some versions of those implementations, pose information of the first actor $A_1$ at the first actor instance $A_{1A}$ can be compared to a corresponding pose instance of stream $S_1$, a corresponding pose instance of stream $S_3$, and a corresponding pose instance of stream $S_5$. These comparisons can be repeated for each of the remaining time instances (e.g., corresponding to the other actor instances $A_{1B}$-$A_{1E}$ of the first actor $A_1$). The lateral distances of table 490D1 can be determined based on these comparisons (e.g., indicated by the arrows in FIG. 4C). In some additional or alternative versions of those implementations, the distance information can be used as in lieu of the pose information for the actor instances $A_{1A}$-$A_{1E}$ of the first actor $A_1$. However, in using the distance information in lieu of the pose information, an orientation component of the additional vehicle corresponding to the first actor $A_1$ may not be included, which may provide a better indication as to whether the additional vehicle is turning at a given intersection.

In some implementations, streams $S_1$, $S_3$, and $S_5$ may initially be represented by the same sequence of pose instances through time instances corresponding to the third actor instance $A_{1C}$, and, as a result, the lateral distance between the actor instances $A_{1A}$-$A_{1C}$ of the first actor $A_1$ and each of the streams $S_1$, $S_3$, and $S_5$ includes little to no variance as indicated by the first three rows in the table 490D1 for these actor instances (e.g., 0 meters). In other words, based on the features associated with the actor instances $A_{1A}$-$A_{1C}$ of the first actor $A_1$ at the corresponding time instances, it is not clear which of the streams the streams $S_1$, $S_3$, and $S_5$ the additional vehicle corresponding to the first actor $A_1$ intends to follow. However, at the time instance corresponding to the fourth actor instance $A_{1D}$ of the first actor $A_1$, the velocity information associated with the additional vehicle corresponding to the first actor $A_1$ may indicate that the additional vehicle is slowing down, the distance information may indicate that the vehicle is beginning to diverge slightly from streams $S_3$ and $S_5$ (e.g., 1 meter as indicated in the table 490D1) and follow stream $S_1$ (e.g., 0 meters), and the pose information associated with the additional vehicle corresponding to the first actor $A_1$ may indicate that the additional vehicle is beginning to turn right (e.g., based on the orientation information of the pose information). Based on one or more of these features, it may be determined that the additional vehicle corresponding to the first actor $A_1$ will follow stream $S_1$ at the fourth actor instance $A_{1D}$ of the first actor $A_1$, and a probability associated with the first actor $A_1$ following stream $S_1$ may be increased, while a probability associated with the first actor $A_1$ following the other streams $S_3$ and $S_5$ may be decreased. Further, at the time instance corresponding to the fifth actor instance $A_{1E}$ of the first actor $A_1$ (e.g., the object corresponding to the first actor $A_1$ as depicted in FIG. 4A), the velocity information associated with the additional vehicle corresponding to the first actor $A_1$ may indicate that the additional vehicle is still slowing down, the distance information may indicate that the vehicle is beginning to diverge further from streams $S_3$ and $S_5$ (e.g., 4 meters as indicated in the table 490D1) and follow stream $S_1$ (e.g., 0 meters), and the pose information associated with the additional vehicle corresponding to the first actor $A_1$ may indicate that the additional vehicle is turning right (e.g., based on the orientation information of the pose information). Based on one or more of these features, it may be determined that the additional vehicle corresponding to the first actor $A_1$ will follow stream $S_1$ at the fifth actor instance $A_{1E}$ of the first actor $A_1$ as well.

In some implementations, the ground truth label(s) (e.g., shown in table 490D2 of FIG. 4D) that are compared to the predicted output(s) for the first actor $A_1$ in the table 490B of FIG. 4B can be generated based on the lateral distances included in the table 490D1 of FIG. 4D. Further, the ground truth label(s) that are compared to the predicted output(s) for the second actor $A_2$ in the table 490B of FIG. 4B can be generated in a similar manner, but based on various actor instances on the second actor $A_2$. The ground truth label(s) can be compared to the predicted output(s) (e.g., shown in table 490B of FIG. 4B) to generate loss(es), and the ML model can be updated based on the loss(es). In some versions of those implementations, the ground truth label(s) can include a ground truth probability distribution. In some further versions of those implementations, probabilities included in the ground truth probability distribution can be binary values. For instance, assuming the additional vehicle corresponding to the first actor $A_1$ follows the stream $S_1$ as depicted in FIGS. 4A and 4C, the ground truth probability distribution for the first actor $A_1$ may be $A_1$: [1.0, 0.0, 0.0, 0.0, 0.0, 0.0, 0.0, 0.0, 0.0, 0.0]. Further, the ground truth probability distribution can be compared to the probability distribution of the predicted output(s) of table 490B of FIG. 4B (e.g., $A_1$: [0.6, 0.0, 0.3, 0.0, 0.1, 0.0, 0.0, 0.0, 0.0, 0.0]) to generate the loss(es) utilized in updating the ML model. In other versions of those implementations, probabilities included in the ground truth probability distribution can be non-binary values. For instance, as shown in table 490D2 of FIG. 4D, and assuming the additional vehicle corresponding to the first actor $A_1$ follows the stream $S_1$ as depicted in FIGS. 4A and 4C, the ground truth probability distribution for the first actor $A_1$ may be $A_1$: [0.80, 0.0, 0.10, 0.0, 0.10, 0.0, 0.0, 0.0, 0.0, 0.0]. These values for the ground truth probability distribution (e.g., 0.8 for stream $S_1$, 0.1 for stream $S_3$, and 0.1 for stream $S_5$) can be generated based on the average lateral distances for each of the actor instances $A_1$-$A_{1E}$. Based on the table 490D1, the average lateral distance from the first actor $A_1$ to stream $S_1$ may be 0 meters, the average lateral distance from the first actor $A_1$ to stream $S_2$ may be 1 meter, and the average lateral distance from the first actor $A_1$ to stream $S_3$ may also be 1 meter. The ground truth probability distribution for the first actor $A_1$ that includes the other values can be generated based on the average lateral distance to each of the streams, and compared to the probability distribution of the predicted output(s) of table 490B of FIG. 4B to generate the loss(es) utilized in updating the ML model.

In some additional or alternative implementations, the ground truth label(s) can include constraints on the vehicle 300 at the given time instance (e.g., time=0.0 seconds) or the subsequent time instance (e.g., time=2.0 seconds). For instance, the constraints on the vehicle 300 may include an indication that the vehicle 300 should not enter the intersection at both the given time instance and the subsequent time instance, that the vehicle 300 should not accelerate at the given time instance and the subsequent time instance, and so on. In some additional or alternative implementations, the ground truth label(s) can include one or more actions the vehicle 300 should perform at the given time instance (e.g., time=0.0 seconds) or the subsequent time instance (e.g., time=2.0 seconds). For instance, the one or more actions may include an indication that the vehicle 300 should yield at a stop sign, or other actions. In some implementations, the constraints and the actions may be specific to a given one of the first actor $A_1$ and the second actor $A_2$. However, the constraints and the actions for both the first actor $A_1$ and the second actor $A_2$ are taken in consideration in generating one or more control strategies for the vehicle 300. For instance, there may not be any constraints on the vehicle 300 based on the first actor $A_1$ (e.g., the additional vehicle associated with the first actor $A_1$ has cleared the intersection), but constraints may be placed on the vehicle based on the second actor $A_2$ (e.g., the another additional vehicle associated with the second actor $A_2$ has not cleared the intersection), and the vehicle 300 may not enter the intersection. The ground truth constraints or ground truth actions (e.g., depicted in the table 490D2 of FIG. 4D) may be compared to predicted constraints or predicted actions (e.g., depicted in the table 490B of FIG. 4B) to generate the loss(es), and the ML model may be updated based on the loss(es).

Figures 5A, 5B:
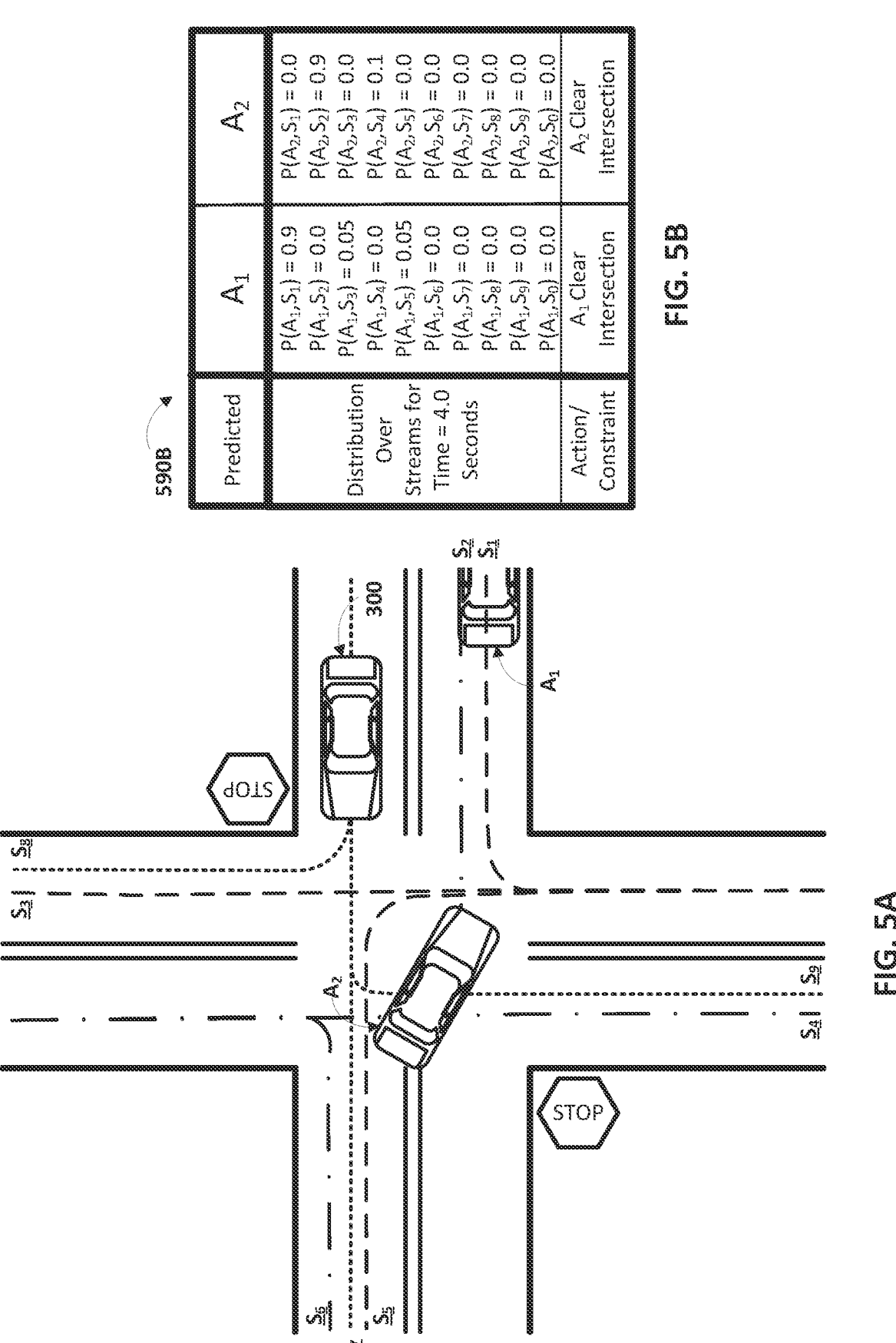
FIGS. 5A and 5B illustrate the example real world environment of FIGS. 3A and 3B at a further subsequent time instance, and illustrate a table including predicted output(s) generated, using a machine learning model, at the further subsequent time instance, in accordance with various implementations.

Continuing with the above example, and turning to FIGS. 5A and 5B, the real world environment of FIG. 3A at a further subsequent time instance, and a table including predicted output(s) generated, using a machine learning model, are depicted. Assume that the first actor $A_1$ and the second actor $A_2$ (or respective features thereof), and of the plurality of streams $S_1$-$S_9$ at a subsequent time instance (e.g., time=2.0 seconds) are processed, using the ML model, to generate further predicted output(s) at a further subsequent time instance (e.g., time=4.0 seconds). In particular, FIG. 5A depicts the environment of FIG. 3A, but progressed four seconds to the further subsequent time instance of the past episode (or progressed two seconds from the environment of FIG. 4A). As shown in FIG. 5A, the additional vehicle corresponding to the first actor $A_1$ has completed the right turn at the intersection at the further subsequent time instance, and the another additional vehicle corresponding to the second actor $A_2$ is still taking a left turn at the intersection at the further subsequent time instance. Further, table 590B of FIG. 5B includes the predicted output(s) generated based on the actors and streams of FIG. 3A for the further subsequent time instance (e.g., time=4.0 seconds). The predicted output(s) depicted in the table 590B include a probability distribution over the streams for each of the actors, and constraints for the vehicle 300. For example, as shown in FIG. 5B, a first probability distribution for the first actor $A_1$: [$S_1$, $S_2$, $S_3$, $S_4$, $S_5$, $S_6$, $S_7$, $S_8$, $S_9$, $S_0$] corresponding to $A_1$: [0.9, 0.0, 0.05, 0.0, 0.05, 0.0, 0.0, 0.0, 0.0, 0.0] can be generated as the predicted output associated with the first actor $A_1$ along with the action/constraint of wait for the first actor $A_1$ to clear the intersection. Further, a second probability distribution for the first actor $A_2$: [$S_1$, $S_2$, $S_3$, $S_4$, $S_5$, $S_6$, $S_7$, $S_8$, $S_9$, $S_0$] corresponding to $A_2$: [0.0, 0.9, 0.0, 0.1, 0.0, 0.0, 0.0, 0.0, 0.0, 0.0] can be generated as the predicted output associated with the second actor $A_2$ along with the action/constraint of wait for the first actor $A_2$ to clear the intersection. In this example, the constraints indicate that the vehicle 300 should not perform any action until both the first actor $A_1$ and the second actor $A_2$ clear the intersection.

In some implementations, ground truth label(s) (or reference label(s)) can be generated based on features associated with the first actor $A_1$ and features the second actor $A_2$ at a plurality of time instances between the subsequent time instance (e.g., time=2.0 seconds) and the further subsequent time instance (e.g., time=4.0 seconds). For example, and turning to FIGS. 5C and 5D, an example of generating the ground truth label(s) at the further subsequent time instance of FIGS. 5A and 5B, and tables including lateral distances for generating the ground truth label(s) are depicted. In some implementations, FIG. 5C depicts streams $S_1$, $S_3$, and $S_5$ that are associated with candidate navigation paths of the first actor $A_1$ without other portions of the environment (e.g., without lane lines, stop signs, the vehicle 300, the second actor $A_2$, or other streams). Further, FIG. 5C depicts various additional instances $A_{1F}$-$A_{1J}$ of the first actor $A_1$ from the subsequent time instance (e.g., time=2.0 seconds) to the further subsequent time instance (e.g., time=4.0 seconds). In other words, the first additional instance $A_{1F}$ of the first actor $A_1$ corresponds to the additional vehicle corresponding to the first actor $A_1$ as depicted in FIG. 4A (e.g., at time=2.0 seconds), and the fifth actor instance $A_{1J}$ (not depicted) of the first actor $A_1$ corresponds to the additional vehicle corresponding to the first actor $A_1$ as depicted in FIG. 5A (e.g., at time=4.0 seconds), and the other instances $A_{1G}$-$A_{1I}$ of the first actor $A_1$ correspond to the additional vehicle at a plurality of additional time instances therebetween.

In generating the ground truth label(s) (e.g., using the autolabeling engine 258A1 of FIG. 2), features associated with the additional vehicle corresponding to the first actor $A_1$ at each of the time instances can be extracted and analyzed to generate the ground truth label(s) in a similar manner described above with respect to FIGS. 4C and 4D. In some implementations, as the additional vehicle corresponding to the first actor $A_1$ continues following along the stream $S_1$, the lateral distance (e.g., indicated by the arrows) between the actor instances $A_{1F}$-$A_{1I}$ of the first actor $A_1$ and the other streams $S_3$ and $S_5$ continues to increase as shown in table 590D1 of FIG. 5D. In implementations where the ground truth label(s) include the probability distributions, this increase in the lateral distances will cause a ground truth probability associated with the stream $S_1$ to greatly increase (e.g., to 0.97 as indicated in table 590D2 of FIG. 5D), and ground truth probabilities associated with the other streams $S_3$ and $S_5$ to decrease. The ground truth label(s) (e.g., shown in table 590D2 of FIG. 5D) that are compared to the predicted output(s) for the first actor $A_1$ in the table 590B of FIG. 5B can be generated based on the lateral distances included in the table 590D1 of FIG. 5D in a similar manner described above with respect to FIGS. 4C and 4D. Further, the ground truth label(s) that are compared to the predicted output(s) for the second actor $A_2$ in the table 590B of FIG. 5B can be generated in a similar manner, but based on various actor instances on the second actor $A_2$. Loss(es) can be generated based on comparing the ground truth label(s) of table 590D2 of FIG. 5D to the predicted output(s) in table 590B of FIG. 5B. For example, the loss(es) can be generated based on comparing the predicted probability distribution of table 590B of FIG. 5B to the ground truth probability distribution of table 590D2 of FIG. 5D for each of the actors, the predicted actions/constraints table 590B of FIG. 5B to the ground truth actions/constraints of table 590D2 of FIG. 5D for each of the actors, or other predicted metrics to other ground truth metrics. The ML model can be updated based on the loss(es), and, subsequent to the training, the ML model can be used in controlling an AV.

It should be noted that the actors and streams of the environment of FIGS. 3A, 4A, 4C, 5A, and 5C are provided for the sake of example, and the environment of FIGS. 3A, 4A, 4C, 5A, and 5C are not meant to be limiting. It should be understood that a quantity of actors included in the environment can be based on a quantity of objects in the environment of the vehicle 300, and that a quantity of streams in the environment can be based on a configuration of the environment of the vehicle 300. For example, if the environment of the vehicle 300 is a two-lane road that does not include any objects, then there may not be any actors and only two streams (i.e., a target stream the vehicle 300 is following along one lane and an adjacent stream for the other lane). Moreover, although the actors depicted in FIGS. 3A, 4A, 4C, 5A, and 5C correspond to additional vehicles, it should be understood that is for the sake of example and is not meant to be limiting. For example, a pedestrian could also be detected in the environment of the vehicle and may be included as another actor, and the crosswalk itself may be included as a stream. Moreover, it should be understood that the actors and streams of the environment of FIGS. 3A, 4A, 4C, 5A, and 5C are based on a single past episode of locomotion. In some implementations, multiple training instances may be generated based on the single past episode of locomotion. The ML model can be further updated based on a plurality of additional training instances that are based on multiple disparate past episodes of locomotion. Further, although the various actor instances are described herein with respect to corresponding to the plurality of time instances, it should be understood that is for the sake of example, and is not meant to be limiting. For example, the various actor instances can correspond to pose instances generated for each of the objects included in the environment of the vehicle 300 and be independent of the plurality of time instances.

Although FIGS. 4A-4D and 5A-5D are described herein as utilizing a single ML model, it should be understood that is for the sake of example, and is not meant to be limiting. In some implementations, multiple ML models can be trained using the techniques described herein. For example, a first ML model can be utilized to process the plurality of actors and streams to generate predicted output associated with a first subsequent time instance (e.g., from 0.0 seconds to 2.0 seconds as shown in FIG. 4A-4D), a second ML model can be utilized to process the plurality of actors and streams to generate predicted output associated with a second subsequent time instance (e.g., from 0.0 seconds to 4.0 seconds or from 2.0 seconds to 4.0 seconds as shown in FIGS. 5A-5D), and so on. In this example, the first ML model can be updated based on the losses generated according to FIGS. 4A-4D, whereas the second ML model can be updated based on the losses generated according to FIGS. 5A-5D. In other implementations, the single ML model can be utilized to generate the predicted output(s) associated with different time instances. For example, the single ML model can process the plurality of actors and the plurality of streams to generate predicted output(s) associated with a first time instance (e.g., at 2.0 seconds), associated with a second time instance (e.g., at 4.0 seconds), and so on.

Figure 6A:
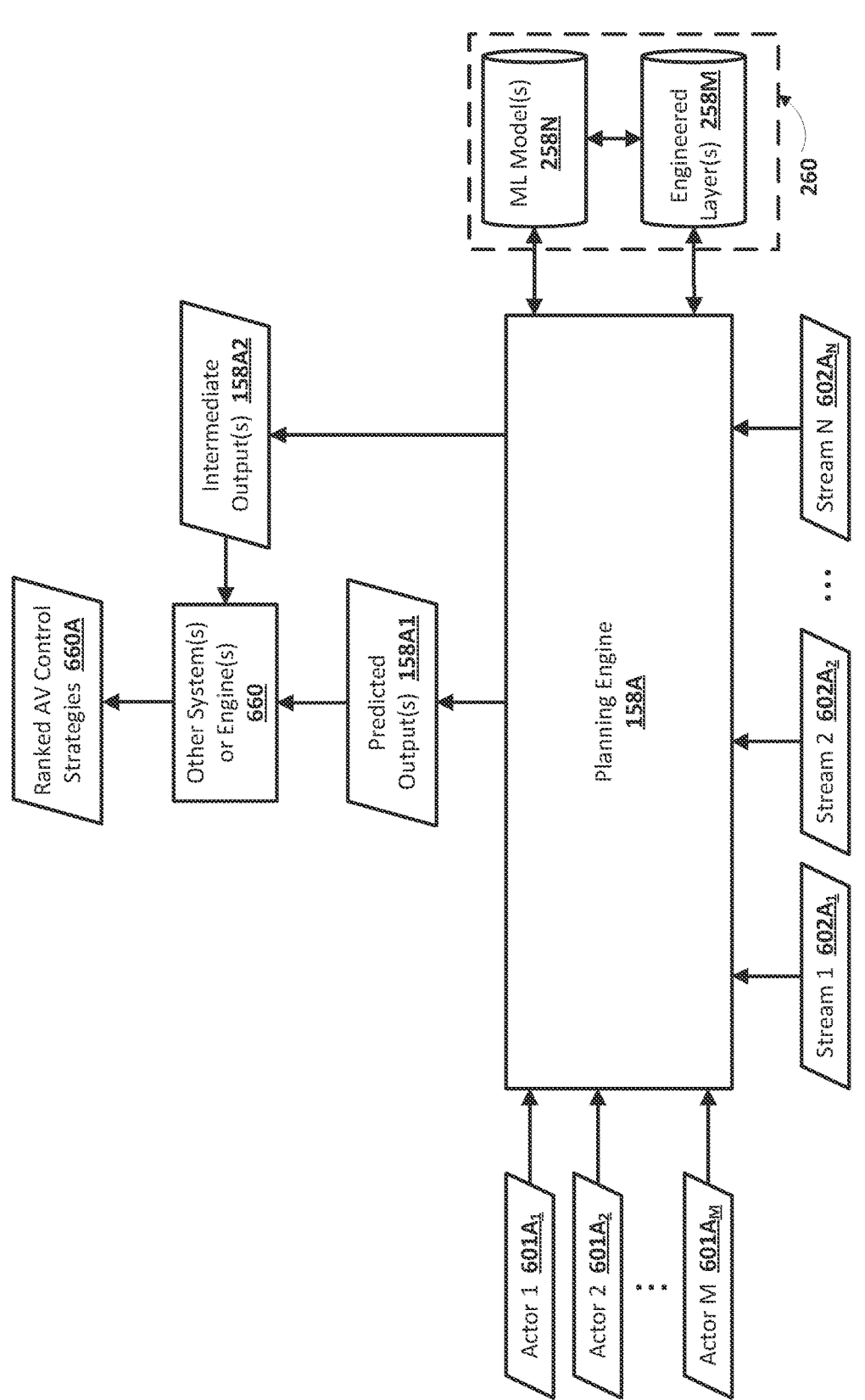
FIG. 6A is a block diagram illustrating an example architecture for using the trained machine learning model of FIG. 2 in controlling an AV, in accordance with various implementations.

Turning now to FIG. 6A, a block diagram illustrating an example architecture for using the trained machine learning model of FIG. 2 in controlling an AV is depicted. The planning engine 158A (e.g., referenced above with respect to FIG. 2) can process, using the ML model stored in ML model(s) database 258N (e.g., also referenced above with respect to FIG. 2), a plurality of actors, and a plurality of streams to generate predicted output(s) 158A1. In some implementations, the ML model may be a portion of an instance of a geometric transformation ML model 260. The instance of the geometric transformation ML model 260 may also include engineered geometric transformation layers stored in engineered layer(s) database 258M. If included, the engineered geometric transformation layers can process each of the actors (or features thereof) and each of the plurality of streams (or the candidate navigation paths corresponding thereto) prior to the processing by the ML model. The engineered geometric transformation layers can correspond to one or more functions that generate a tensor of values based on processing the plurality of actors and the plurality of streams. Further, the tensor of values can be applied as input across the ML model to generate the predicted output(s) 258B1.

As described herein (e.g., with respect to FIGS. 2, 4B, and 5B), the predicted output(s) 158A1 can be a probability distribution for each of the actors that includes a probability associated with each of the streams, one or more constraints of the AV, or one or more actions that can be performed by the AV. For instance, an environment of the AV can be identified based on sensor data generated by one or more sensors of the AV, and the plurality of actors can be captured in the sensor data. Further, the plurality of streams can be identified (e.g., from a prior mapping of the environment) based on the environment or the plurality of actors captured in the environment. In some implementations, the plurality of actors (or features thereof) and the plurality of streams can be represented as a tensor of values (optionally generated based on processing by the engineered geometric transformation layers), such as a vector or matrix of real numbers corresponding to the features of the plurality of actors and the plurality of streams.

For example, the plurality of actors can include Actor 1 $601A_1$, Actor 2 $601A_2$, and so on through Actor M $601A_M$, where M is a positive integer corresponding to a quantity of actors in the environment of the AV. Further, the plurality of streams can include Stream 1 $602A_1$, Stream 2 $602A_2$, and so on through Stream N $602A_N$, wherein N is a positive integer corresponding to a quantity of sequences of pose instances corresponding to candidate navigation paths in the environment of the AV. In some implementations, the plurality of actors (or features thereof) and the plurality of streams can be processed, using the ML model, in a parallelized manner as shown in FIG. 6A. In applying the plurality of actors and the plurality of streams as input in a parallelized manner across the ML model, the ML model seeks to project features of each of the actors onto each of the plurality of streams in the environment of the AV. In other words, the AV can continually process the actors and streams in the environment of the AV to determine relationships between each of the actors and each of the streams, and in a manner that allows the AV to predict current and future predictions of positions and orientations of actors in the environment of the AV. The planning engine 158A may withhold the predicted output(s) 158A1 until the processing of the plurality of actors and the plurality of streams across the ML model is complete.

In some implementations, the AV can be controlled based directly on the predicted output(s) 158A1. For example, if the predicted output(s) 158A1 includes actions to be performed by the AV, then the AV can be controlled based on the predicted output(s) 158A1. In this example, the predicted output(s) 158A1 can optionally include control commands associated with the actions to be performed by the AV. In some additional or alternative implementations, the predicted output(s) 158A1 can be transmitted to other system(s) or engine(s) 660. The other system(s) or engine(s) 660 can process the predicted output(s) 158A1 to generate ranked AV control strategies 660A for the AV. The other system(s) or engine(s) 660 can include, for example, other engine(s) of the planning subsystem 158 of FIG. 1, engine(s) of the control subsystem 160 of FIG. 1, or other system(s) or engine(s). Further, other system(s) or engine(s) 660 can utilize additional layer(s) of the ML model, additional ML model(s), rule(s), or other means for processing the predicted output(s) 158A1 to generate the ranked AV control strategies 660A for the AV. The AV may then be controlled based on the ranked AV control strategies 660A (or control commands associated therewith). In some versions of those implementations, the planning engine 158A can also provide intermediate output(s) 158A2 generated across the ML model to the other system(s) or engine(s) 660. For example, if the ML model is a transformer ML model, then the intermediate output(s) 158A2 can include encodings of features of the plurality of actors, encoding of the plurality of streams, attentioned actors, attentioned streams, or other intermediate output generated across the transformer ML model. The intermediate output(s) 158A2 may help provide a better representation of a current state of the environment of the AV to predict more accurate future states of the environment of the AV.

Figure 6B:
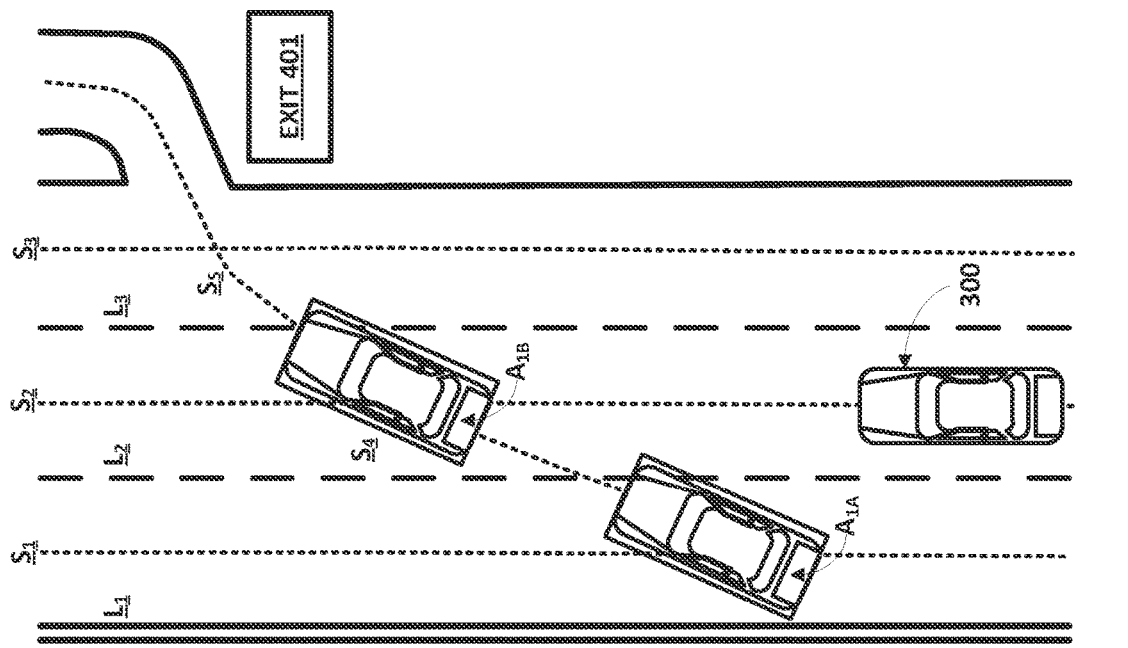
FIG. 6B illustrates an example real world environment for using the trained machine learning model of FIG. 6A in controlling an AV, in accordance with various implementations.

Turning now to FIG. 6B, an example real environment for using the trained machine learning model of FIG. 6A in controlling an AV is depicted. The environment of FIG. 6B illustrates a highway having a first lane $L_1$, a second lane $L_2$, and a third lane $L_3$, and an exit ramp for Exit 401. Vehicle 300 is travelling down the second lane $L_2$ of the highway, and an object (e.g., additional vehicle) corresponding to a actor is travelling down the first lane $L_1$ of the highway. The environment also includes a first stream $S_1$ associated with a candidate navigation path of travelling straight along the first lane $L_1$ of the highway, a second stream $S_2$ associated with a candidate navigation path of travelling straight along the second lane $L_2$ of the highway, a third stream $S_3$ associated with a candidate navigation path of travelling straight along the third lane $L_3$ of the highway, a fourth stream $S_4$ associated with a candidate navigation path of merging from the first lane $L_1$ of the highway to the second lane $L_2$ of the highway for the actor, and a fifth stream $S_5$ associated with a candidate navigation path of merging from the second lane $L_2$ of the highway to the second lane $L_3$ of the highway for the actor and off Exit 401.

With respect to FIG. 6B, assume that the actor initiates a merging action at a given time instance (e.g., as indicated by the actor at $A_1$) along stream $S_4$, and further assume that the actor continues the merging action at a subsequent time instance (e.g., as indicated by the actor at $A_{1_B}$) along stream $S_5$ such that the first actor takes Exit 401 to exit the highway at a further subsequent time instance. One or more ML models trained according to the techniques described can process a plurality of features associated with the actor at $A_{1_A}$ (e.g., features described with respect to FIG. 3B), and can process the plurality of streams of the environment of FIG. 6B (e.g., streams $S_1$-$S_5$). In some implementations, a given ML model can process the plurality of features associated with the actor at $A_{1_A}$ and the plurality of streams to generate predicted output(s) associated with the actor at the subsequent time instance (e.g., at time=3.0 seconds), and to generate predicted output(s) associated with the actor at the further subsequent time instance (e.g., at time=6.0 seconds). In some additional or alternative implementations, a first ML model can process the plurality of features associated with the actor at $A_{1_I}$ and the plurality of streams to generate predicted output(s) associated with the actor at the subsequent time instance (e.g., at time=3.0 seconds), and a second ML model can process the plurality of features associated with the actor at $A_{1_A}$ and the plurality of streams to generate predicted output(s) associated with the actor at the further subsequent time instance (e.g., at time=6.0 seconds).

For instance, the predicted output(s) associated with the actor at the subsequent time instance may indicate that it is unlikely the actor will follow a candidate navigation path associated with the first stream $S_1$ at the subsequent time instance since the geometric relationship(s) and the orientation of the actor indicates that it has initiated the merge action at the given time instance. Accordingly, the predicted output(s) associated with the actor may indicate that the actor is more likely to follow the second stream $S_2$ and the fourth stream $S_4$. Further, the predicted output(s) associated with the actor at the subsequent time instance may further indicate a constraint that the vehicle 300 should brake since the actor is merging along the fourth stream $S_4$ in front of the vehicle 300 and that the vehicle 300 should not be within a threshold distance of the actor at $A_{1_A}$. Further, the predicted output(s) associated with the actor at the further subsequent time instance may indicate that it is unlikely the actor will follow a candidate navigation path associated with the second stream $S_2$ at the further subsequent time instance since the geometric relationship(s) and the orientation of the actor indicates that it is heading towards Exit 401 (e.g., as indicated by the orientation of the actor at $A_1$). Accordingly, the predicted output(s) associated with the actor may indicate that the actor is more likely to follow the third stream $S_3$ and the fifth stream $S_5$. Further, the predicted output(s) associated with the actor at the further subsequent time instance may further indicate a constraint that the vehicle 300 should not merge from the second lane $L_2$ to the third lane $L_3$ since it is likely the actor will continue merging.

Moreover, and assuming the actor merges from the first lane $L_1$ to the second lane $L_2$ along the fourth stream $S_4$, the actor may be at $A_{1_B}$ at the subsequent time instance. The predicted output(s) associated with the actor may indicate that the actor is more likely to follow the fifth stream $S_5$ based on the orientation of the actor at the subsequent time instance. Further, the predicted output(s) associated with the actor at the further subsequent time instance may further indicate a constraint that the vehicle 300 should not merge from the second lane $L_2$ to the third lane $L_3$ since it is likely the actor will continue merging. Accordingly, the ML model can leverage the plurality of features of the actor (including orientation(s) and geometric relationship(s)) to predict where the additional vehicle corresponding to the actor will be at future time instances. This enables the vehicle 300 to not only plan a route in view of the object corresponding to the actor, but also avoid routes that may conflict with a predicted route of the object corresponding to the actor.

In various implementations, and prior to the processing by the ML model, engineered geometric transformation layers can be utilized to process the plurality of actors and the plurality of streams. The engineered geometric transformation layers can generate a tensor of values that is then processed by the ML model to generate the predicted output(s). The tensor of values encodes the geometric relationships between the plurality of actors and the plurality of streams. In implementations that include the engineered geometric transformation layers, the engineered geometric transformation layers and the ML model form an instance of a geometric transformation model. For example, assume the ML model is a transformer ML model that includes at least a plurality of attention layers. In these examples, the attention layers of the transformer ML model can be attentioned to the geometry of each actor as it relates to each of the other actors in the environment and as it relates to each of the streams in the environment.

Turning now to FIG. 7, a flowchart illustrating an example method 700 of training a ML model is depicted. For convenience, the operations of the method 700 are described with reference to a system that performs the operations. The system may include various components of various devices, including those described in FIGS. 1 and 2, server(s), local computing device(s) (e.g., laptop, desktop computer, and so on), other computing systems having memory and processors, or any combination thereof. Moreover, while operations of the method 700 are shown in a particular order, this is not meant to be limiting. One or more operations, elements, or steps may be reordered, omitted, or added.

At block 752, the system identifies a past episode of locomotion of a vehicle. The past episode of locomotion of the vehicle can be captured in driving data generated by the vehicle. In particular, the driving data can include sensor data generated by sensors of the vehicle during the past episode of locomotion. In some implementations, the driving data can be manual driving data that is captured while a human is driving a vehicle (e.g., an AV or non-AV retrofitted with sensors (e.g., primary sensor 130 of FIG. 1)) in a real world and in a conventional mode, where the conventional mode represents the vehicle under active physical control of a human operating the vehicle. In other implementations, the driving data can be autonomous driving data that is captured while an AV is driving in a real world and in an autonomous mode, where the autonomous mode represents the AV being autonomously controlled. In yet other implementations, the driving data can be simulated driving data captured while a virtual human is driving a virtual vehicle in a simulated world.

At block 754, the system identifies, at a given time instance of the past episode of locomotion, a plurality of actors in an environment of the vehicle. The plurality of actors may each correspond to an object in the environment of the vehicle. The actors can include, for example, additional vehicles that are static in the environment (e.g., a parked vehicle) or dynamic in the environment (e.g., a vehicle merging into a lane of the AV), bicyclists, pedestrians, or any other dynamic objects in the environment of the vehicle. Further, each of the plurality of actors can be associated with a plurality of features. The features can include, for example, velocity information associated with each of the actors, distance information associated with each of the actors, and pose information associated with each of the actors. The velocity information can include historical, current, and predicted future velocities of each of the plurality of actors. The distance information can include a lateral distance from each of the plurality of actors to each of the plurality of streams. The pose information can include position information and orientation information, of each of the plurality of actors, within the environment of the vehicle.

At block 756, the system identifies a plurality of streams associated with the environment of the vehicle. The plurality of streams may each correspond to a sequence of poses that represent candidate navigation paths, in the environment of the vehicle, for the vehicle or the actors. The plurality of streams can be stored in a previously generated mapping of the environment of the vehicle. Each of the plurality of streams can belong to one of multiple disparate types of streams. The multiple disparate types of streams can include, for example, a target stream that the vehicle followed, joining streams that merge with the target stream, crossing streams that transverse the target stream, adjacent streams that are parallel to the target stream, additional streams that are one-hop from any of the other streams, or a null stream. The type of stream, for a given one of the plurality of streams, may be based on which of the plurality of streams is the target stream (e.g., as described above with respect to FIG. 3A). In some implementations, the plurality of actors (or features thereof) and the plurality of streams may be considered training instance input.

At block 758, the system determines whether it has received any ground truth label(s) (or reference label(s)) for the past episode. The ground truth label(s) may be considered corresponding training instance output for the training instance input noted above (e.g., the plurality of actors (or features thereof) and the plurality of streams). In some implementations, the system can generate the ground truth label(s) for the plurality of time instances of the past episode. If, at an iteration of block 758, the system determines that it has not received the ground truth label(s), then the system may proceed to block 760. At block 760, the system generates, for each of the plurality of actors, and at a subsequent time instance of the past episode of locomotion, the ground truth label(s).

For example, and referring now to FIG. 8, a flowchart illustrating an example method 760A of generating the ground truth label(s) for training the ML model for the example method 700 of FIG. 7 is depicted. At block 852, the system identifies the given time instance from the past episode of locomotion. The given time instance can be defined by user input (e.g., detected via the user input engine 290 of FIG. 2), randomly selected from the past episode of locomotion, or selected according to one or more actions being performed by the vehicle (e.g., when the vehicle enters an intersection, when the vehicle begins merging, when objects begin merging, or other actions). At block 854, the system extracts, from the past episode of locomotion, features associated with each of the plurality of actors for a corresponding plurality of time instances between the given time instance and the subsequent time instance. The features associated with each of the plurality of actors are described above with respect to block 754. Further, the features can be extracted for a plurality of time instances of the past episode of locomotion.

At block 856, the system determines geometric relationship(s) for a given one of the plurality of actors for each of the plurality of time instances. For example, the geometric relationship(s) can include a lateral distance to the given stream that is included in the distance information of the features for the given actor for each of the plurality of time instances. As another example, the geometric relationship(s)

can include a lateral distance to the given stream that is determined based on comparing the pose information of the features of the given actor in the distance information of the features for the given actor to the sequence of poses of the given stream for each of the plurality of time instances. In some implementations, these geometric relationship(s) are not limited to lateral distances, and are described in greater detail herein (e.g., with respect to FIG. 3B).

At block 858, the system determines whether there is an additional stream in the environment of the AV. If, at an iteration of block 858, the system determines there is an additional stream in the environment, the system may return to block 856 to determine additional geometric relationships for the given one of the plurality of actors, and proceed to a subsequent iteration of block 858. If, at the subsequent iteration of block 858, the system determines there is another additional stream in the environment, the system may return to block 856 to determine additional geometric relationship(s) from the given one of the plurality of actors to the another additional stream of the plurality of streams, other actors and features included in the environment (e.g., lane lines, curbs, etc.), or any combination thereof. This process may be repeated until the geometric relationship(s) for each of the plurality of streams are determined for the given one of the plurality of actors. If, at an iteration of block 858, the system determines there are no additional streams in the environment (or features), the system may proceed to block 860.

At block 860, the system determines whether there is an additional actor in the environment of the AV. If, at an iteration of block 860, the system determines there is an additional actor in the environment, the system may return to block 856 to determine further additional geometric relationship(s) from the additional one of the plurality of actors to the stream of the plurality of streams (and optionally other actors and features included in the environment), and proceed to a subsequent iteration of block 858. If, at the subsequent iteration of block 858, the system determines there is another additional stream in the environment (or other actors and features included in the environment), the system may return to block 856 to determine yet further additional geometric relationship(s) from the additional one of the plurality of actors to the another additional stream of the plurality of streams. This process may be repeated until the geometric relationship(s) to each of the plurality of streams is determined for the additional one of the plurality of actors. Further, this process may be repeated for each of the plurality of actors. If, at an iteration of block 860, the system determines there are no additional actors in the environment, the system may proceed to block 862.

At block 862, the system generates, based on the geometric relationships, and for each of the plurality of actors, the ground truth label(s). In some implementations, block 862 may include optional sub-blocks 862A and 862B. If included, at block 862A, the system determines, for each of the actors, average geometric relationship(s) to each of the streams. For example, an average lateral distance for each of the actors to each of the streams can be determined based on summing each of the lateral distances to a given stream and dividing the summed lateral distances by a number of lateral distances determined by the system. If included, at block 862B, the system determines probabilities associated with each of the average lateral distances to each of the streams. The probabilities can be based on a mapping, from average lateral distances to probabilities, that is heuristically defined. In some additional or alternative implementations, the raw geometric relationships can be utilized in lieu of determining the probabilities at optional sub-block 862B.

Referring back to FIG. 7, and in some additional or alternative implementations, the system can receive user input (e.g., detected via user input engine 290 of FIG. 2) that defines the ground truth label(s) for a plurality of time instances for the past episode of locomotion. If, at an iteration of block 758, the system determines that it has received the ground truth label(s) for the past episode, then the system may proceed to block 762 and skip block 760. In various implementations, the system may both receive some ground truth label(s) for the past episode of locomotion, and generate other ground truth label(s) for the past episode of locomotion. For example, ground truth label(s) associated with actions and constraints of the vehicle may be defined for the past episode based on user input, while probability distributions are generated according to the method 760A of FIG. 8.

At block 762, the system can process, using the ML model, the plurality of actors and the plurality of streams to generate predicted output(s) for each of the plurality of actors. In some implementations, the system can process the plurality of actors (or features thereof) and the plurality of streams using the ML model in a parallelized manner. Further, the predicted output(s) may not be output until the ML model has completed processing of the plurality of actors and the plurality of streams. The predicted output(s) can include at least one of: (i) a probability distribution for each of the plurality of actors, where each probability in the probability distribution is associated with a given one of the plurality of streams at the given time instance or the subsequent time instance; (ii) one or more actions that the vehicle should perform at the given time instance or the subsequent time instance; or (iii) one or more constraints on the vehicle at the given time instance or the subsequent time instance. The predicted output(s) are described in greater detail herein (e.g., with respect to FIGS. 4A, 4B, 5A, and 5B).

At block 764, the system compares the predicted output for each of the plurality of actors to the ground truth label(s) for each of the plurality of actors. At block 766, the system generates, based on the comparing, one or more losses. For example, the system can compare a predicted probability distribution for each of the plurality of actors with a corresponding ground truth probability distribution. As another example, the system can compare predicted action(s) of the vehicle to ground truth action(s) of the vehicle. As yet another example, the system can compare predicted constraint(s) of the vehicle to ground truth constraint(s) of the vehicle. Based on one or of the comparisons in these examples, the system can generate one or more losses.

At block 768, the system updates the ML model based on one or more of the losses. The system can update the ML model by, for example, backpropagating one or more of the losses across the ML model to update weights of the ML model. Subsequent to updating the ML model based on one or more of the losses at block 768, the system may return to block 762. At a subsequent iteration of block 762, the system can identify the same past episode of locomotion of the vehicle or an additional past episode of locomotion of the vehicle or an additional vehicle. The system can generate an additional training instance based on a subsequent iteration of the method 700, and can further update the ML model based on the additional training instance. The system can repeat this process until one or more conditions are satisfied with respect to the ML model. The one or more conditions can include, for example, the ML model being trained on a threshold quantity of training instances, the ML model being trained for a threshold duration of time, an error rate in using the ML model satisfies an error threshold, or other conditions.

Turning now to FIG. 9, a flowchart illustrating an example method 900 of using the trained machine learning model of FIG. 8 is depicted. For convenience, the operations of the method 900 are described with reference to a system that performs the operations. The system may include various components of various devices, including those described in FIG. 6A, server(s), local computing device(s) (e.g., laptop, desktop computer, and so on), other computing systems having memory and processors, or any combination thereof. Moreover, while operations of the method 900 are shown in a particular order, this is not meant to be limiting. One or more operations, elements, or steps may be reordered, omitted, or added.

At block 952, the system obtains a sensor data instance of sensor data generated by one or more sensors of the AV. The one or more sensors can include, for example, one or more of LIDAR, RADAR, camera(s), or other sensors (e.g., primary sensors 130 of FIG. 1). The sensor data can processed to identify an environment of the AV and to detect objects in the environment of the AV. At block 954, the system identifies, based on the sensor data instance, a plurality of actors in an environment of the vehicle. The environment, and the plurality of actors located therein, can be identified based on the sensor data instance. For example, the environment can be identified based on processing sensor data via a localization system (e.g., localization subsystem 152 of FIG. 1). Further, each of the plurality of actors can be identified from an instance of LIDAR data generated by a LIDAR sensor, an instance of RADAR data generated by a RADAR sensor, or an instance of image data generated by vision component(s). At block 956, the system identifies a plurality of streams associated with the environment of the vehicle. The plurality of streams can be associated with the environment of the AV can identified from a previous mapping of the environment of the AV.

More particularly, in identifying the plurality of s and the plurality of streams in the environment of the AV, the system can identify a plurality of corresponding features associated with each of the plurality of actors based on processing the sensor data. In some implementations, the plurality of features can be defined with respect to each of the plurality of actors. For example, the plurality of features associated with a given actor can include a lateral distance between the given actor and each of the plurality of streams, a lateral distance between the given actor and each of the other actors, a lateral distance between the given actor and one or more lane lines, a longitudinal distance between the given actor and each of the other actors, an absolute velocity of the given actor, a relative velocity of the given actor with respect to each of the other actors, an acceleration of the given actor, and so on. Further, the plurality of features associated with each of the other actors can include similar features, but with respect to each of the other actors. In some additional or alternative implementations, the plurality of features can be defined with respect to the AV. For example, the plurality of features associated with a given actor can include a lateral distance between the given actor and the AV, a longitudinal distance between the given actor and the AV, and a relative velocity of the given actor with respect to the AV. In some implementations, the plurality of features provides geometric information between each of the plurality of actors and the AV. The ML model can be used to leverage this geometric information to forecast candidate navigation paths of each of the actors at subsequent time instances based on the plurality of features at a given time instance.

At block 958, the system processes, using a ML model, the plurality of actors and the plurality of streams to generate predicted output(s) associated with each of the plurality of actor(s). In some implementations, the system can process the plurality of actors (or features thereof) and the plurality of streams using the ML model in a parallelized manner. For example, the plurality of actors (or features thereof), and the plurality of streams (or the sequence of poses corresponding thereto) can be represented as a tensor of values, and processed using the ML model. At block 960, the system causes the AV to be controlled based on the predicted output(s). In some implementations, block 960 may include optional sub-block 960A. If included, at sub-block 960A, the system transmits the predicted output(s) to other system(s) or engine(s) to generate ranked AV control strategies for controlling the AV. In some additional or alternative implementations, block 960 may include optional sub-block 960B. If included, at sub-block 960A, the system utilizes the predicted output(s) directly in controlling the AV.

Other variations will be apparent to those of ordinary skill. Therefore, the invention lies in the claims hereinafter appended.

What is claimed is:

1. A method for training a machine learning ("ML") model for use by an autonomous vehicle ("AV"), the method comprising:

generating a plurality of training instances, each of the plurality of training instances comprising:

training instance input, the training instance input comprising:

one or more associated actors at a given time instance of an associated past episode of locomotion of a vehicle, wherein each of the one or more associated actors correspond to an object in an environment of the vehicle during the associated past episode of locomotion, and wherein the vehicle is the AV or an additional vehicle that is in addition to the AV; and a plurality of associated streams in an environment of the vehicle during the associated past episode of locomotion, wherein each stream, of the plurality of associated streams, corresponds to a candidate navigation path for the vehicle or one of the associated actors; and training instance output, the training instance output comprising:

one or more reference labels that are associated with the past episode of locomotion, wherein the one or more reference labels include a respective probability that the object will follow the candidate navigation path of each of the plurality of associated streams;

training the ML model using the plurality of training instances, wherein the trained ML model is subsequently utilized in controlling the AV.

2. The method of claim 1, wherein the respective probability that the object will follow the candidate navigation path of each of the plurality of associated streams is represented as a ground truth probability distribution for each of the one or more associated actors.

3. The method of claim 2, further comprising, for a particular training instance of the plurality of training instances:

generating the respective ground truth probability distribution for each of the one or more associated actors, wherein generating the respective ground truth probability distribution for each of the one or more associated actors comprises:

extracting, for a plurality of time instances of the past episode that are subsequent to the given time instance, a plurality of associated features associated with each of the one or more associated actors;

determining, based on the plurality of associated features associated with each of the one or more associated actors, and for each of the plurality of time instances, a lateral distance between each of the one or more associated actors and each of the plurality of associated streams; and generating, based on the lateral distance between each of the one or more associated actors and each of the plurality of associated streams, and for each of the plurality of time instances, the respective ground truth probability distribution for each of the one or more associated actors.

4. The method of claim 1, wherein each of the one or more reference labels further includes a ground truth constraint, for the vehicle, and associated with the given time instance or a subsequent time instance that is subsequent to the given time instance, and wherein the ground truth constraint includes information related to where the vehicle cannot be located, at the given time instance, and in the environment of the past episode of locomotion.

5. The method of claim 1, wherein each of the one or more reference labels further includes a ground truth action, for the vehicle, and associated with the given time instance or a subsequent time instance that is subsequent to the given time instance, and wherein the ground truth action includes information related to an action performed by the vehicle, at the given time instance, and in the environment of the past episode of locomotion.

6. The method of claim 1, wherein each of the one or more associated actors from the given time instance of the past episode include a plurality of associated features, wherein the plurality of associated features for each of the associated actors comprise at least one of:

velocity information for the object, the velocity information including at least one of: a current velocity of the object, or historical velocities of the object, distance information for the object, the distance information including a distance between the object and each of the plurality of streams, or pose information associated with the object, the pose information including at least one of: location information, or orientation information for the object in the past episode.

7. The method of claim 1, wherein each stream, of the plurality of associated streams, corresponds to a sequence of poses that represent the candidate navigation path, in the environment of the vehicle, for the vehicle or one of the associated actors.

8. The method of claim 7, wherein the plurality of associated streams include at least one of:

a target stream corresponding to the candidate navigation path the vehicle will follow, a joining stream that merges into the target stream, a crossing stream that is transverse to the target stream, an adjacent stream that is parallel to the target stream, or an additional stream that is one-hop from the joining stream, the crossing stream, or the adjacent stream.

9. The method of claim 1, wherein the object includes at least one of an additional vehicle that is located in the environment of the vehicle, a bicyclist, or a pedestrian.

10. The method of claim 9, wherein the object is dynamic in the environment of the vehicle along a particular stream of the plurality of streams.

11. The method of claim 1, further comprising, for one or more of the plurality of training instances:

receiving user input that defines one or more of the reference labels.

12. The method of claim 1, wherein training the ML model based on the plurality of training instances comprises, for each of the plurality of training instances:

processing, using the ML model, the one or more actors at the given time instance of the associated past episode of locomotion and the plurality of associated streams in the environment of the vehicle during the associated past episode of locomotion to generate predicted output;

determining, based on the predicted output, a respective predicted probability that the object will follow the candidate navigation path of each of the plurality of associated streams at a future time instance of the associated past episode of locomotion comparing the respective probability that the object will follow the candidate navigation path of each of the plurality of associated streams to the respective predicted probability that the object will follow the candidate navigation path of each of the plurality of associated streams at the future time instance to generate an error; and updating the ML model based on the error.

13. The method of claim 12, wherein the ML model is a transformer ML model that includes at least a plurality of layers, and wherein the plurality of layers include at least a plurality of encoding layers, a plurality of decoding layers, and a plurality of attention layers.

14. The method of claim 1, wherein subsequently utilizing the trained ML model in controlling the AV comprises:

processing, using the trained ML model, sensor data generated by one or more sensors of the AV to generate predicted output; and causing the AV to be controlled based on the predicted output.

15. The method of claim 14, wherein causing the AV to be controlled based on the predicted output comprises:

processing, using one or more additional layers of the ML model, one or more rules, or one or more additional ML models, the output to rank AV control strategies; and causing the AV to be controlled based on one or more of the ranked AV control strategies.

16. A system training a machine learning ("ML") model for use by an autonomous vehicle ("AV"), the system comprising:

at least one processor; and memory storing instructions that, when executed, cause the at least one processor to:

generate a plurality of training instances, each of the plurality of training instances comprising:

training instance input, the training instance input comprising:

one or more associated actors at a given time instance of an associated past episode of locomotion of a vehicle, wherein each of the one or more associated actors correspond to an object in an environment of the vehicle during the associated past episode of locomotion, and wherein the vehicle is the AV or an additional vehicle that is in addition to the AV; and a plurality of associated streams in an environment of the vehicle during the associated past episode of locomotion, wherein each stream, of the plurality of associated streams, corresponds to a candidate navigation path for the vehicle or one of the associated actors; and training instance output, the training instance output comprising:

one or more reference labels that are associated with the past episode of locomotion, wherein the one or more reference labels include a respective probability that the object will follow the candidate navigation path of each of the plurality of associated streams;

train the ML model using the plurality of training instances, wherein the trained ML model is subsequently utilized in controlling the AV.

17. The system of claim 16, wherein the respective probability that the object will follow the candidate navigation path of each of the plurality of associated streams is represented as a ground truth probability distribution for each of the one or more associated actors.

18. The system of claim 16, wherein each of the one or more reference labels further includes a ground truth constraint, for the vehicle, and associated with the given time instance or a subsequent time instance that is subsequent to the given time instance, and wherein the ground truth constraint includes information related to where the vehicle cannot be located, at the given time instance, and in the environment of the past episode of locomotion.

19. The system of claim 16, wherein each of the one or more reference labels further includes a ground truth action, for the vehicle, and associated with the given time instance or a subsequent time instance that is subsequent to the given time instance, and wherein the ground truth action includes information related to an action performed by the vehicle, at the given time instance, and in the environment of the past episode of locomotion.

20. The system of claim 16, wherein the instructions to train the ML model based on the plurality of training instances further cause the at least one processor to, for each of the plurality of training instances:

process, using the ML model, the one or more actors at the given time instance of the associated past episode of locomotion and the plurality of associated streams in the environment of the vehicle during the associated past episode of locomotion to generate predicted output;

determine, based on the predicted output, a respective predicted probability that the object will follow the candidate navigation path of each of the plurality of associated streams at a future time instance of the associated past episode of locomotion compare the respective probability that the object will follow the candidate navigation path of each of the plurality of associated streams to the respective predicted probability that the object will follow the candidate navigation path of each of the plurality of associated streams at the future time instance to generate an error; and update the ML model based on the error.

* * * * *